United States Patent
Pape et al.

(10) Patent No.: US 6,969,103 B2
(45) Date of Patent: Nov. 29, 2005

(54) MOBILE BATTLE CENTER AND COMMAND TABLE FOR A MOBILE BATTLE CENTER

(75) Inventors: Dennis M. Pape, Decatur, AL (US); Wayne L. Reed, Huntsville, AL (US); Richard W. Seeman, Madison, AL (US)

(73) Assignee: Raytheon Company, Waltham, MA (US)

( * ) Notice: Subject to any disclaimer, the term of this patent is extended or adjusted under 35 U.S.C. 154(b) by 314 days.

(21) Appl. No.: 10/267,771

(22) Filed: Oct. 9, 2002

(65) Prior Publication Data

US 2004/0070227 A1 Apr. 15, 2004

(51) Int. Cl.$^7$ ................................................ B62C 1/06
(52) U.S. Cl. ..................... 296/25; 296/24.3; 296/161; 108/44; 108/50.02; 108/115
(58) Field of Search .................. 296/25, 24.3, 161; 108/44, 48, 35, 115, 50.01, 50.02

(56) References Cited

U.S. PATENT DOCUMENTS

| | | | | |
|---|---|---|---|---|
| 5,921,614 A | * | 7/1999 | Biedermann et al. | 296/159 |
| 6,070,925 A | * | 6/2000 | Moldofsky | 296/26.08 |
| 6,179,368 B1 | * | 1/2001 | Karlsson | 296/161 |
| 6,250,702 B1 | * | 6/2001 | Eipper | 296/26.1 |
| 6,739,269 B1 | * | 5/2004 | Benton | 108/44 |

* cited by examiner

Primary Examiner—Joseph D. Pape
(74) Attorney, Agent, or Firm—Iandiorio & Teska

(57) ABSTRACT

A mobile battle center featuring a command table, a foldable tent for covering the command table, and a transport vehicle for transporting the tent and the command table. The command table includes an aft section, a forward section, electronic equipment stations securely mounted to the aft section, the forward section, or both sections and a bus housing electronic cables running to the electronic equipment stations. An intermediate section is hinged to the forward section and the aft section, the aft section foldable up and over the forward section for transport of the table, the intermediate section providing clearance for the electronic equipment stations when the table is folded. Foldable legs support the table in the deployed position. The transport vehicle includes an equipment rack electrically coupled to the electronic equipment stations of the command table via the bus.

70 Claims, 21 Drawing Sheets

MOBILE BATTLE CENTER AND COMMAND TABLE FOR A MOBILE BATTLE CENTER

RELATED APPLICATIONS

The invention disclosed herein was funded in part under U.S. Government Contract No. DACA 76098-0002. The U.S. Government may have certain rights in the subject invention.

FIELD OF THE INVENTION

This invention relates to a folding command table with integral electronic equipment stations and also to a complete mobile battle center including the command table, a tent, and a transport vehicle.

BACKGROUND OF THE INVENTION

Current tactical operation centers (TOCs) housed in trailers, tents, or vehicles are often limited in maneuverability, too heavy to be easily transported by certain aircraft, involve inflexible dedicated designs and worse are complicated to move, deploy, operate, and tear down. Often, the electronic equipment stations including communication stations such as SINCGARS ASIP radios and computer work stations and the associated electronic equipment racks must be unpackaged and electrically interconnected and the power supplies and associated antennas then deployed. Deployment of such TOCs can take over two hours or more and tear down of such systems can take just as long.

Thus, current TOCs do not meet emerging military requirements for quickly deployable highly maneuverable systems on or proximate the battlefield or other sites where tactical operations centers are required.

SUMMARY OF THE INVENTION

It is therefore an object of this invention to provide a mobile battle center which is highly maneuverable.

It is a further object of this invention to provide such a mobile battle center which is lightweight enough to be transported by aircraft such as the UH-60 Blackhawk helicopter.

It is a further object of this invention to provide such a mobile battle center which is designed to be flexible in operation and designed to have a standardized, accepted system architecture (e.g., the Army Airborne Command and Control System or A2C2S).

It is a further object of this invention to provide such a mobile battle center which eliminates the need to unpackage and hook up all of the associated electronic equipment.

It is a further object of this invention to provide such a mobile battle center which can be deployed and stowed for travel in less than ten minutes.

It is a further object of this invention to provide such a mobile battle center which is electrically self powered.

It is a further object of this invention to provide such a mobile battle center which requires few cable interconnections which must be made by personnel deploying the mobile battle center.

It is a further object of this invention to provide such a mobile battle center which provides reconfigurable command and control functionality necessary to direct military operations at various echelons.

It is a further object of this invention to provide such a mobile battle center which can be fully transported by and is configured to fit within a HMMWV transport vehicle.

The invention results from the realization that a much more versatile, maneuverable, lightweight, and quickly deployable mobile battle center is effected by a foldable command table with integrated electronic equipment stations and a tent for optionally protecting the command table wherein both the command table and the tent are compact enough to be packaged in an HMMWV vehicle equipped with an onboard electronic equipment rack electrically connected to the integrated electronic equipment stations of the foldable command table.

This invention features a mobile battle center comprising, as a primary component thereof, a command table including an aft section, a forward section, and electronic equipment stations securely mounted to the aft section, the forward section, or both sections. An intermediate section is hinged to the forward section and the aft section. In this way, the aft section is foldable up and over the forward section for transport of the table, the intermediate section provides clearance for the electronic equipment stations when the table is folded. Foldable legs support the table in the deployed position.

Preferably, the aft, forward, and intermediate sections are made of opposing face sheets with a honeycomb core therebetween. Also, a communications bus extends from the aft section to the forward section electrically connecting the electronic equipment stations to a remote equipment rack. Also included may be brackets upstanding from the proximal end of the forward section for supporting the distal end of the aft section in the folded position. The brackets typically support monitors hingedly attached thereto, the monitors foldable adjacent the brackets and deployable upwards.

Typically, the electronic equipment stations include communications stations and workstations, e.g., five communications stations and four workstations. Two work stations are located on opposite sides of the forward section and two workstations are located on opposite sides of the aft section. There may be two communications stations located on opposite sides of the forward section, two communications stations located on opposite sides of the aft section, and one communications station located on the distal end of the aft section. Also, the distal end of the aft section may further include electrical interconnections for a personal computer. Typically, the oppositely located workstations are offset from each other and the oppositely located communications stations are also offset from each other.

In one example, there are four sets of foldable legs, e.g., two sets of foldable legs hingedly attached on opposite sides of the aft section and two sets of foldable legs hingedly attached to opposite sides of the intermediate section. Each set of legs includes two leg members.

Further included may be a rail extending on each side of the table, and a set of foldable chairs for the command table.

In one specific embodiment, the electronic equipment stations are configured in accordance with the A2C2S architecture. Typically, the electronic equipment stations are mounted to the table via brackets.

The mobile battle center may further include a foldable tent for covering the command table, a transport vehicle for transporting the tent and the command table, and a boot extending between the tent when deployed and the transport vehicle. In one embodiment, the transport vehicle (e.g., a HMMWV vehicle) includes an equipment rack electronically coupled to the electronic equipment stations of the command table.

The transport vehicle may further include one or more power supplies for powering the equipment rack, one or more antennas, and a rear bumper for supporting the proximal end of the forward section of the command table. Typically, cables are removably connected to the intermediate section of the command table and extend upwards to the transport vehicle for supporting the command table during deployment. Also, a system of ropes and pulleys may be attached to the transport vehicle for removing the tent from the transport vehicle.

One preferred mobile battle center in accordance with this invention features a command table including an aft section, a forward section, electronic equipment stations securely mounted to the aft section, the forward section, or both sections, and a bus housing electronic cables running to the electronic equipment stations. An intermediate section is hinged to the forward section and the aft section, the aft section foldable up and over the forward section for transport of the table, the intermediate section providing clearance for the electronic equipment stations when the table is folded. Foldable legs support the table in the deployed position. A foldable tent covers the command table and a transport vehicle is supplied for transporting the tent and the command table. The transport vehicle includes an equipment rack electrically coupled to the electronic equipment stations of the command table via the bus.

One preferred command table in accordance with this invention includes an aft section, a forward section, brackets upstanding from the proximal end of the forward section, electronic equipment stations including communications stations and workstations securely mounted to the forward and aft sections of the table and monitors hingedly mounted to the brackets, a communications bus extending from the aft section to the forward section electrically connecting the electronic equipment stations to a remote equipment rack, an intermediate section hinged to the forward section and the aft section so that the aft section can be folded up and over the forward section and supported by the brackets for transport of the table, the intermediate section providing clearance for the electronic equipment stations when the table is folded, and foldable legs for supporting the table in the deployed position.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
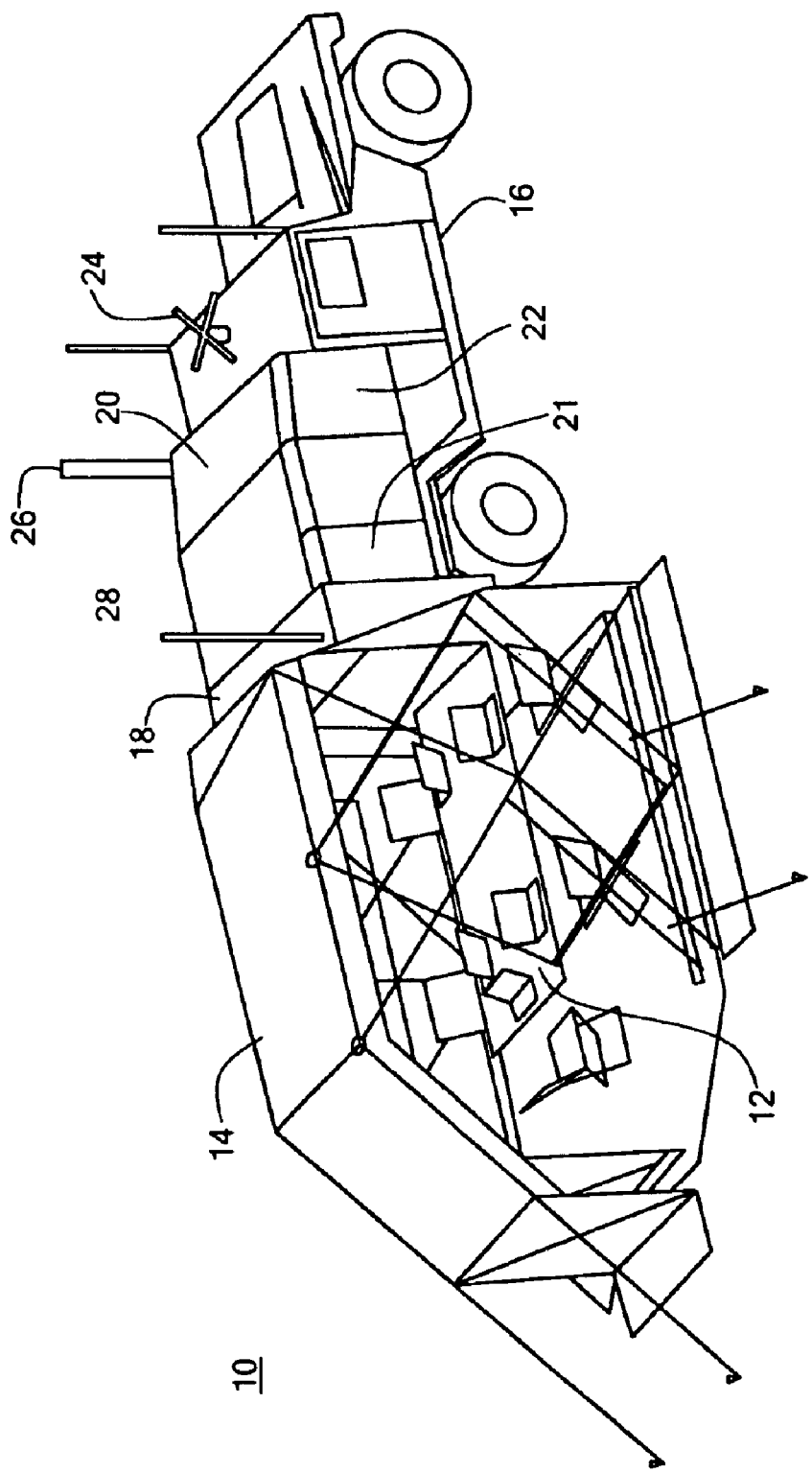
FIG. 1 is a schematic three-dimensional view showing the primary subsystems associated with one embodiment of the mobile battlefield center of the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Mobile battle center 10, FIG. 1, in accordance with this invention, includes command table 12 inside tent 14 coupled to HMMWV transport vehicle 16 by boot 18. Vehicle 16 includes communication, processing, and networking equipment racks under canopy 20 in area 22, a high voltage alternator for standalone power, SATCOM/HAVEQUICK antenna 24, 15M antenna mast 26 for SINCGARS and EPLRS and two SINCGARS antennas 28. Command table 12 includes integral electronic equipment stations securely mounted thereto and a flexible communications bus electronically connected to the communications, processing, and networking equipment racks located under canopy 20 of transport vehicle 16.

For transport to a battlefield site, the command table with its electronic equipment stations in place folds and is placed under canopy portion 21 of HMMWV transport vehicle 16.

Tent 14 collapses and is also packaged in HMMWV transport vehicle 16 under canopy portion 21. Thus, mobile battle center 10 is extremely maneuverable across difficult terrain and yet also lightweight enough to be transported by a UH-60 Blackhawk helicopter. In addition, mobile command center 10 is fully deployable in under ten minutes and can be quickly dissassembled stowed for travel also in under ten minutes.

Figure 2:
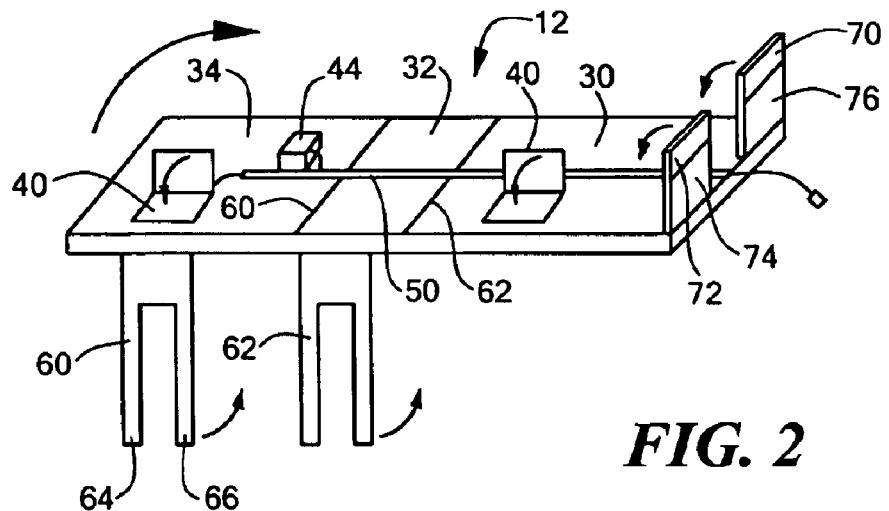
FIG. 2 is a highly schematic three dimensional view showing an embodiment of the foldable command table and its integrated electronic equipment stations in accordance with the subject invention.
Figure 3:
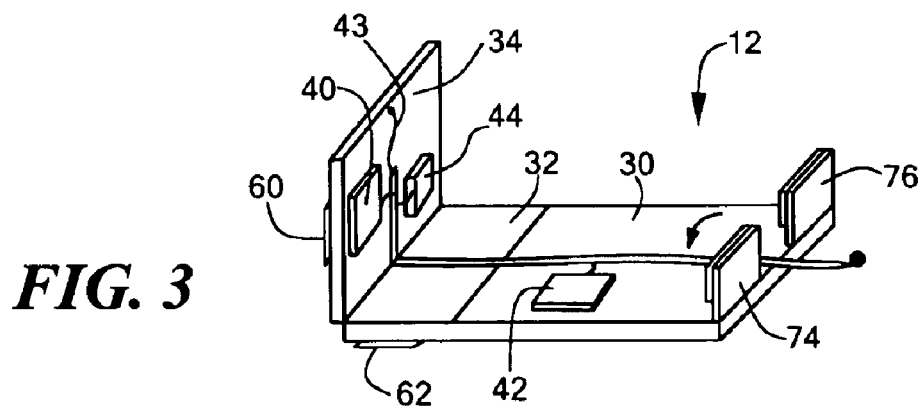
FIGS. 3–4 are highly schematic three dimensional views showing how the command table of FIG. 2 is folded for transport in accordance with the subject invention.
Figure 4:
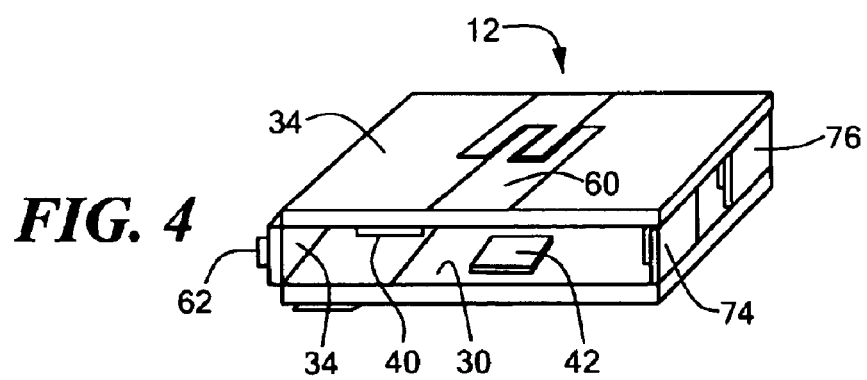

FIGS. 2–4 schematically show the foldable nature of command table 12 which, in the preferred embodiment, includes 52"×48" forward section 30, 14"×48" intermediate section 32, and 48"×48" aft section 34. Electronic equipment stations such as stations 40 and 44 are securely mounted to aft and forward sections 34 and 30 by mounting brackets. In this specific example, stations 40 are SPARC AXI workstations and stations 44 are TOCNET operator's stations. Flexible communications bus 50 runs from aft section 34 to forward section 30 and houses all of the electrical interconnections associated with the electronic equipment stations integral with table 12 connected to the electronic equipment racks housed in HMMWV vehicle 16, FIG. 1. Bus 50 also includes electrical connections 43, FIG. 3, for a personal computer which can be placed on the distal end of aft section 34.

Intermediate section 32, FIG. 2, of the table, is hinged at each end to aft section 34 and forward section 30 as shown at 60 and 62 to fold command table 12 for transport. First, the monitors of workstations 40 are folded down as are the two common displays 70 and 72 which are folded down and clamped to supporting brackets 74 and 76 upstanding from the proximal end of forward section 30. Then, aft section 34, FIG. 3 is folded upwards as is intermediate section 32, FIG. 4 until aft section 34 is positioned up and over forward section 30. Intermediate section 32 provides the necessary clearance for electronic equipment stations 40 and 44 when table 12 is folded as shown in FIG. 4 where the distal end of aft section 34 rests on brackets 74 and 76. Next, foldable leg sets 60 and 62 are folded up. The folded command table assembly is supported by two cables located on the roadside and curbside of the table. Typically, there are two foldable leg sets for aft table section 34 on opposite sides thereof and two foldable leg sets for intermediate table section 32 on opposite sides thereof. In this example, each foldable leg set includes two leg members 64 and 66 as shown for foldable leg set 60.

Figure 5:
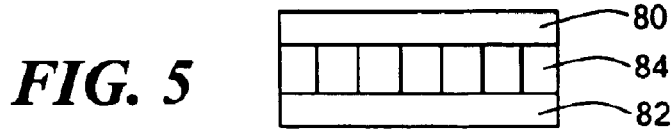
FIG. 5 is a cross-sectional view of a portion of the table shown in FIGS. 2–4.

In one example, the aft 34, intermediate 32, and forward 30 table sections are one inch thick and made of opposing face sheets 80 and 82, FIG. 5, with honeycomb core 84 therebetween.

Figure 6:
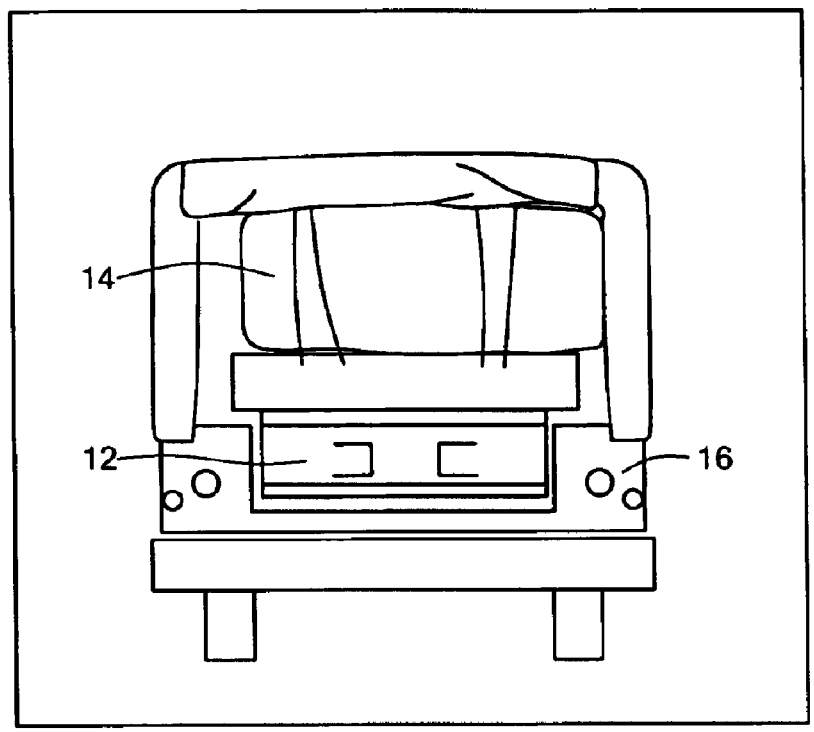
FIG. 6 is a schematic view showing the various subsystems of the mobile battle center of the subject invention during transport thereof.
Figure 7:
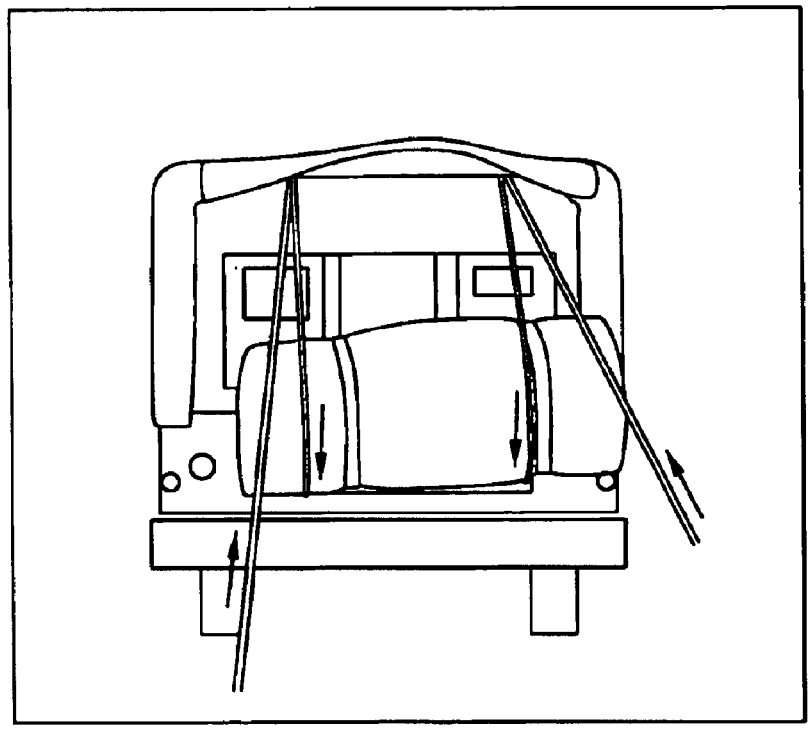
FIG. 7 is a schematic view showing how the tent of the mobile battle center is unloaded from the transport vehicle.
Figure 8:
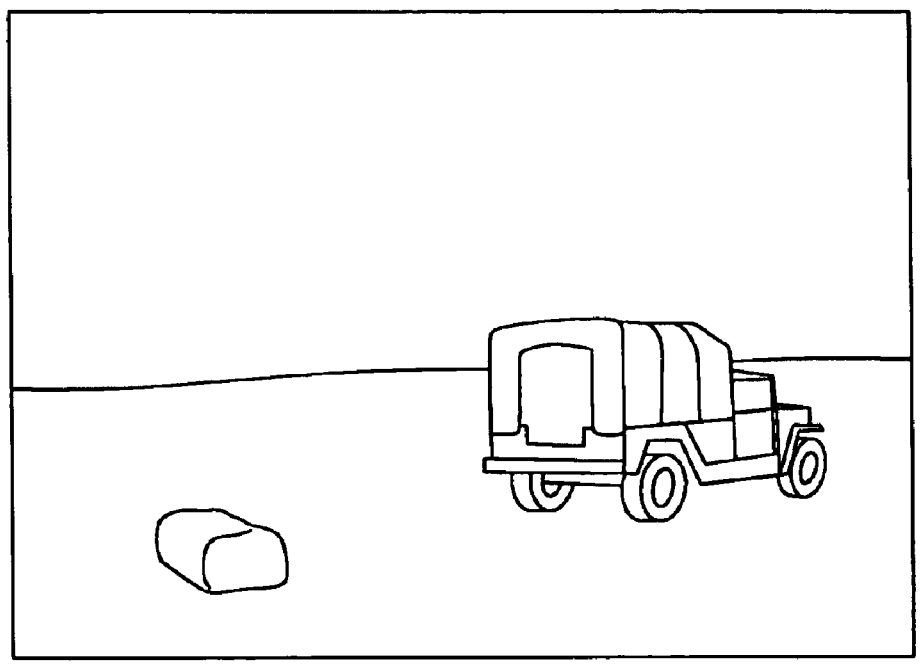
FIGS. 8–13 are schematic views showing how the tent of the subject invention is deployed.
Figure 9:
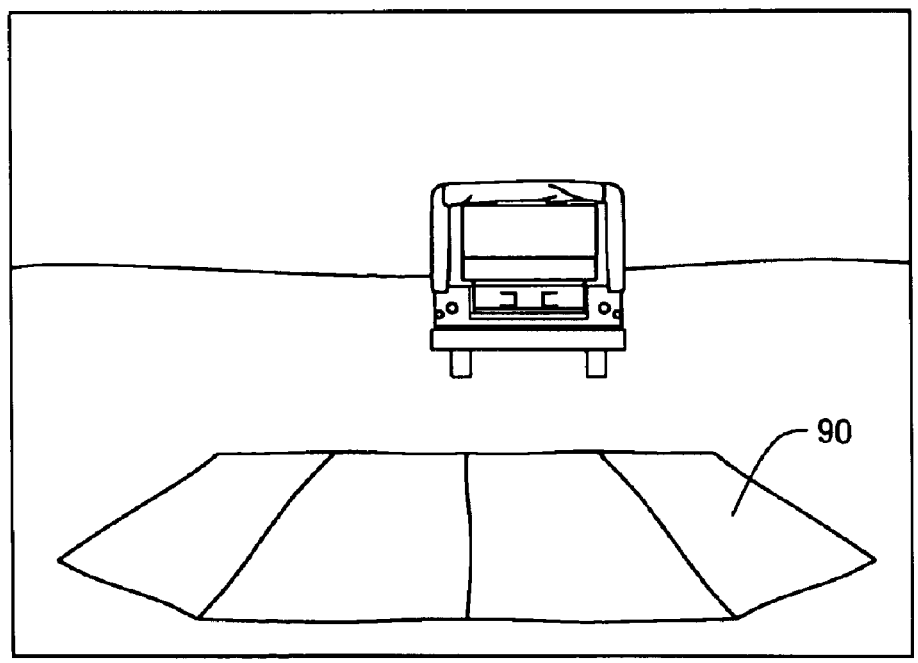
Figure 10:
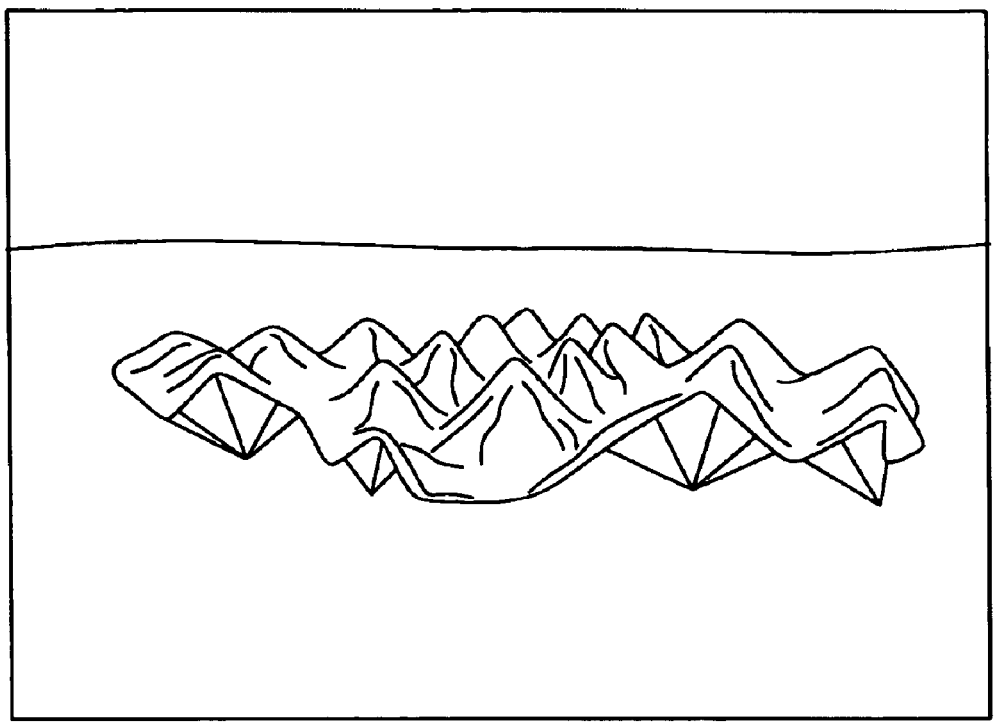
Figure 11:
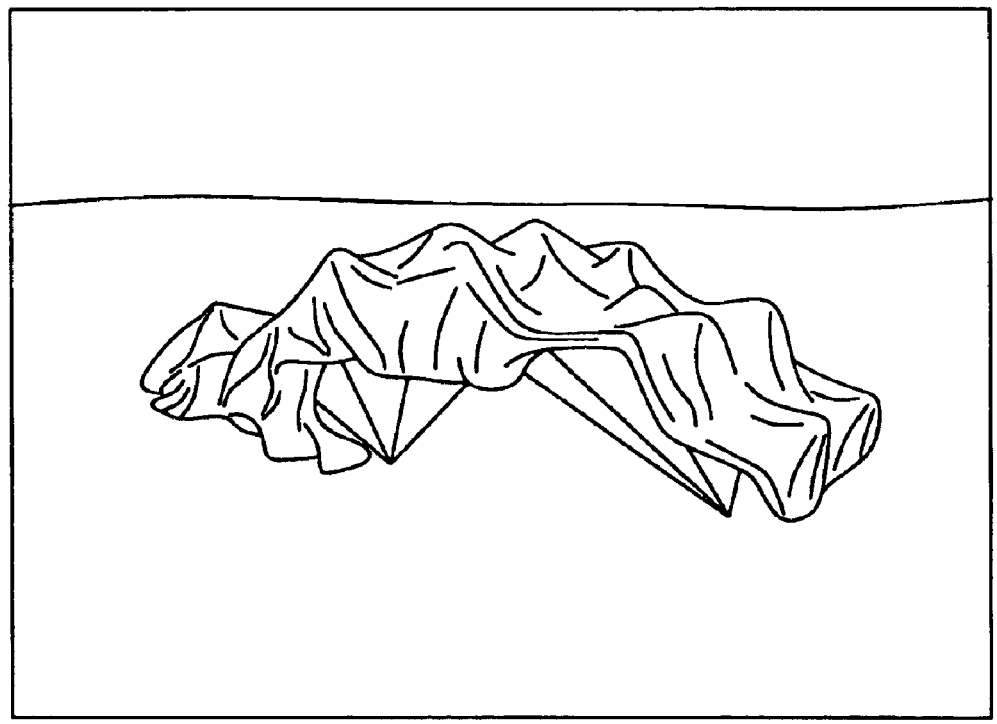
Figure 12:
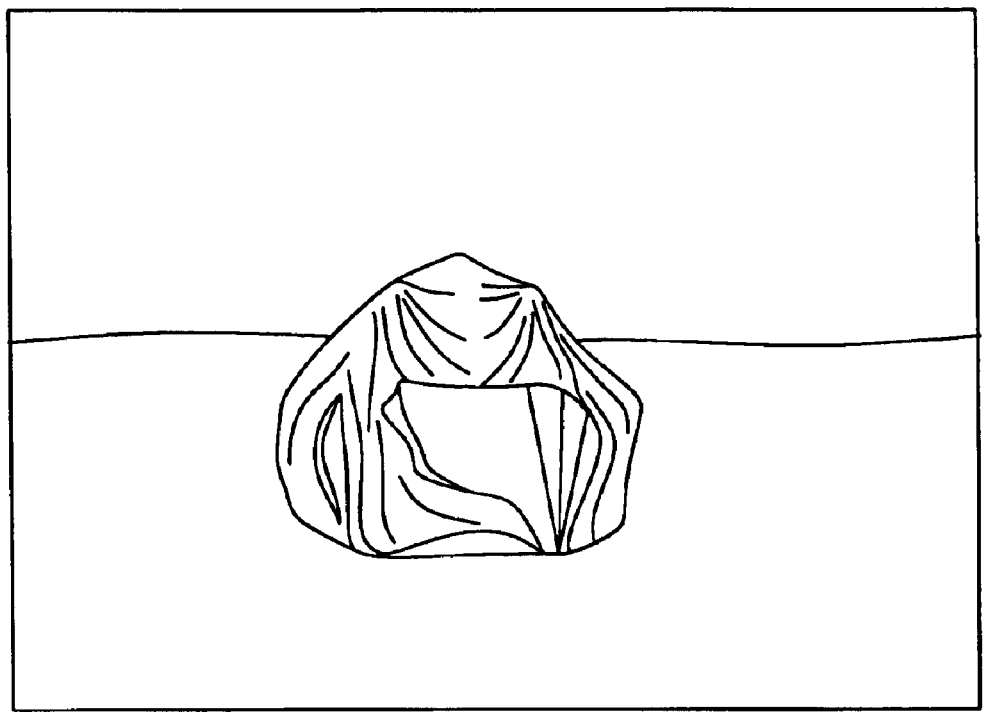
Figure 13:
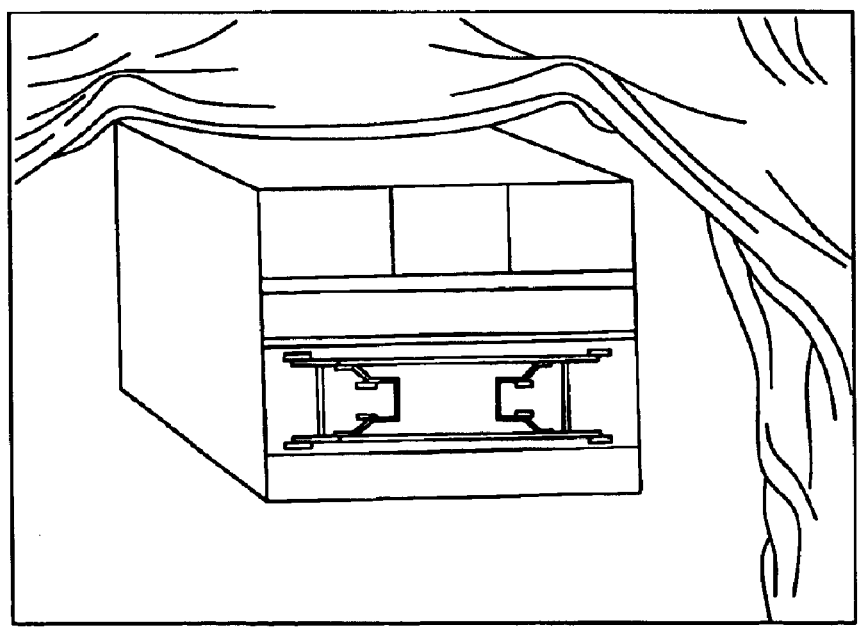

Table 12, in its folded configuration is shown packaged in HMMWV vehicle 16 in FIG. 6 as is tent 14. Once vehicle 16 arrives at the specified battle field location or command site, tent 14 is unloaded using the system of ropes and pulleys attached to vehicle 16 as shown in FIG. 7. Tent 14 is rolled clear of vehicle 16 as shown in FIG. 8 and unpackaged whereupon ground cover 90, FIG. 9 is located parallel to the rear of vehicle 16 and centered. Tent 14 is then expanded, FIG. 10, opened, FIG. 11, and aligned with the floor, FIG. 12. The boot 18, FIG. 13 of vehicle 16 is then aligned and attached to tent 14.

Figure 14:
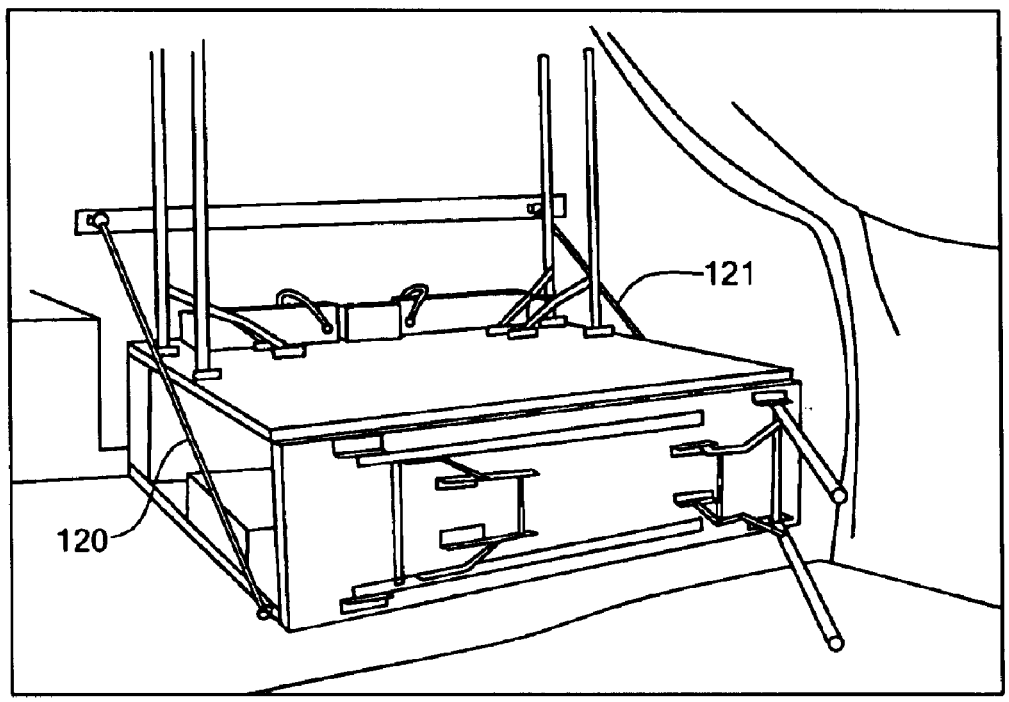
FIG. 14 is a schematic view showing the deployment of the folding command table of the subject invention.
Figure 15:
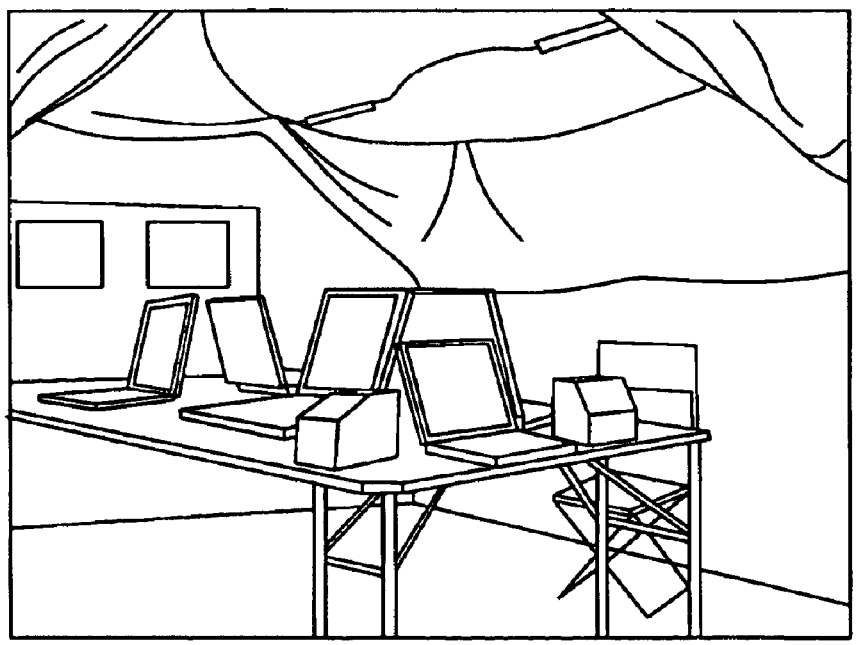
FIGS. 15–17 are schematic views showing the final steps associated with deploying the mobile command center of the subject invention.
Figure 16:
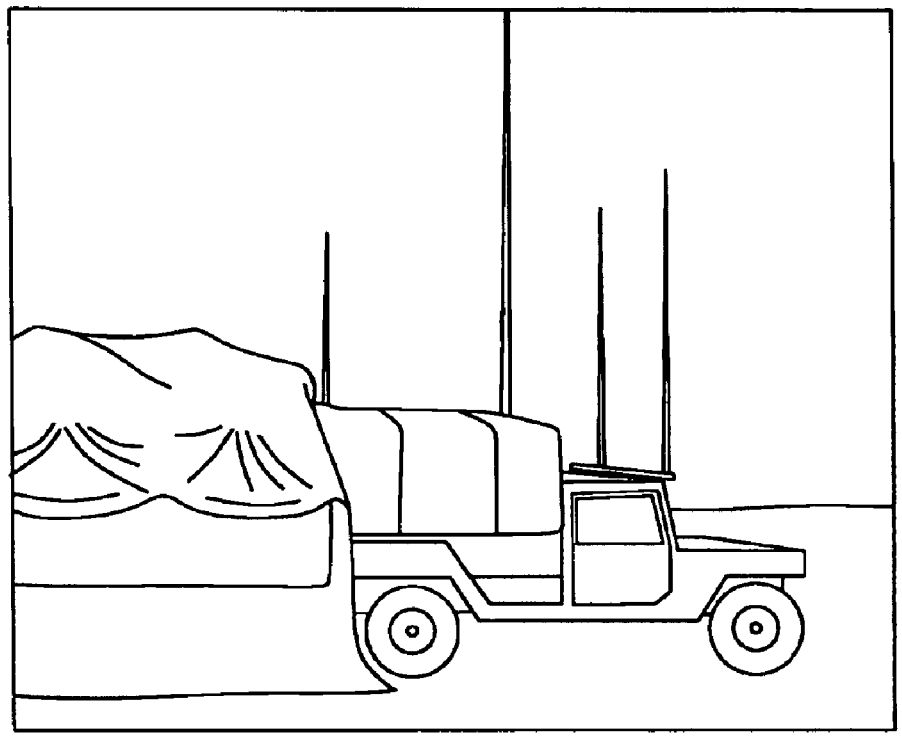
Figure 17:
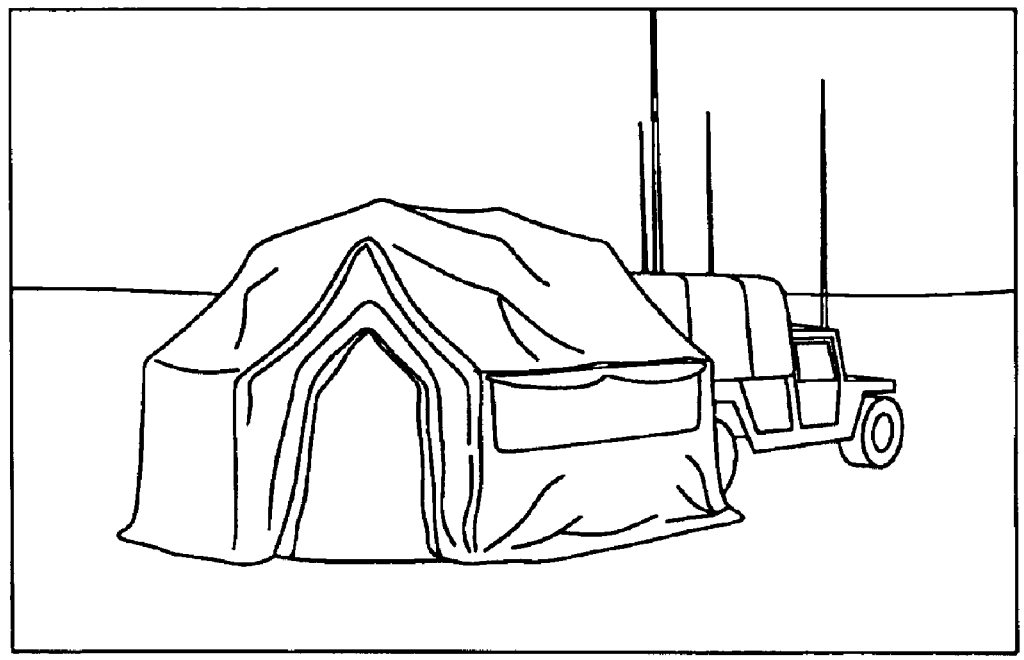

Next, table 12 is deployed, FIG. 14. The various software applications are brought up, FIG. 15, the antennas installed, FIG. 16, and final setup operations completed, FIG. 17.

In testing, full deployment as shown in FIGS. 6–17 took eight minutes and thirty-two seconds during daylight hours and nine minutes and thirty seconds at night by two or three people compared to two hours or more required in order to setup prior art command centers. Current tactical operation commands (TOC's), in contrast, require several vehicles containing discrete electronic components be interconnected by a series of electrical connections and protected by several shelter/tent elements. Deployment and recovery of the current TOC configurations can take from several hours to days. The mobile battle center of this invention performs nearly all or similar functions in one self-sustaining, single vehicle system.

Figure 18:
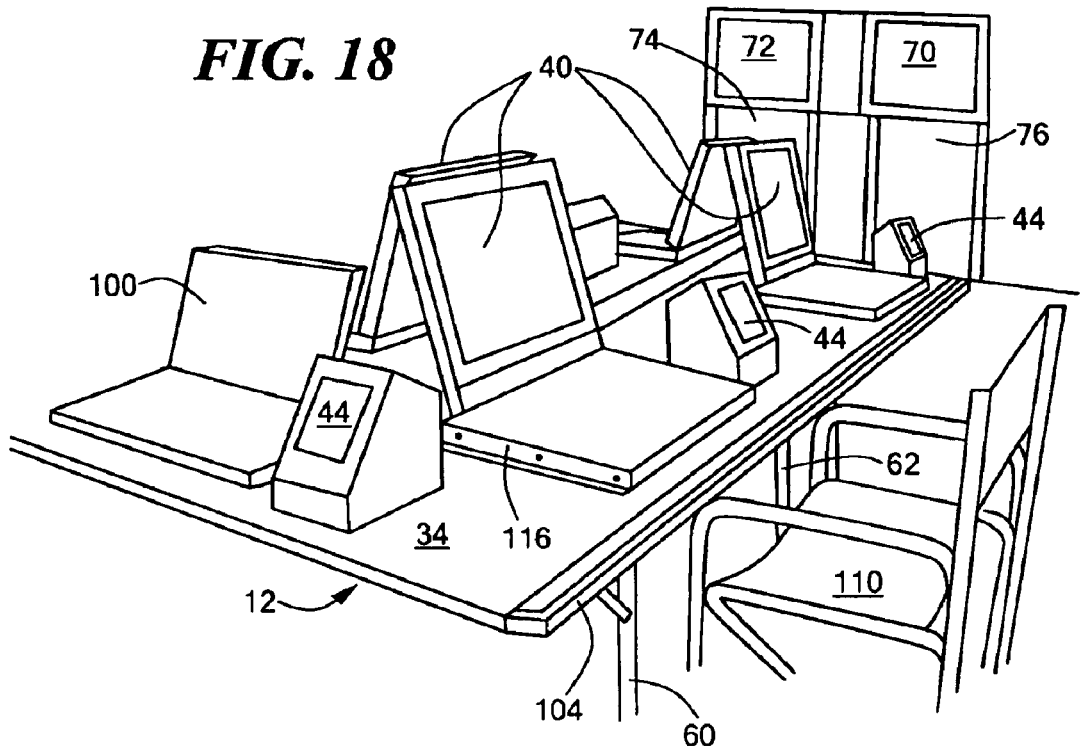
FIG. 18 is a schematic three-dimensional view showing an embodiment of the command table of this invention fully deployed and ready for use.

FIG. 18 shows one preferred embodiment of table 12 wherein monitors 70 and 72 are hingedly attached to brackets 74 and 76 and shown deployed upwards and wherein there are five-communications stations 44 and five workstations 40. Two workstations are located on opposite sides of forward section 30 in an offset manner and two workstations are located on opposite sides of aft section 34 also in an offset manner. There are two communications stations 44 located on opposite sides of forward section 30, two communications stations located on opposite sides of aft section 34 and one communication station located on the distal end of aft section 34 as shown more clearly in FIG. 19. Typically, the distal end of the aft section further includes a space and electrical interconnections for personal computer 100, FIG. 18.

Figure 19:
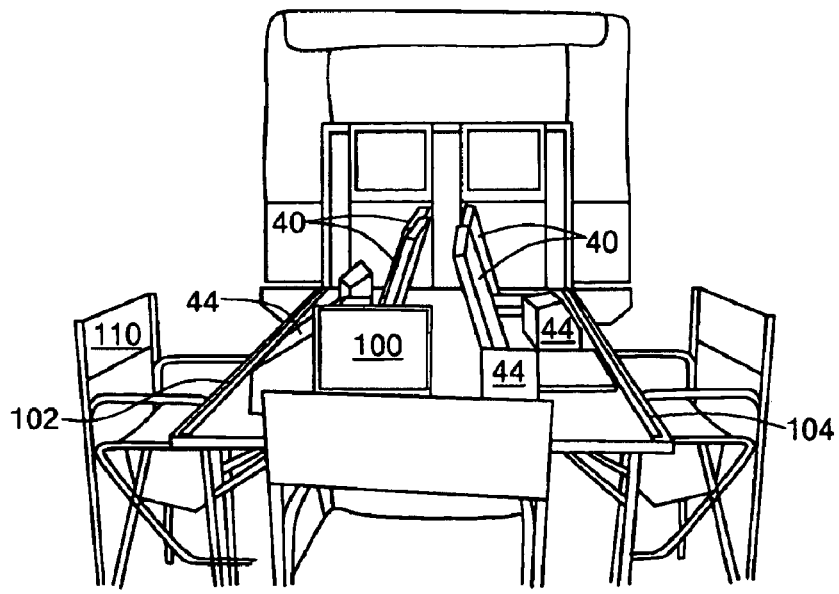
FIG. 19 is an end view of the command table shown in FIG. 18.

FIGS. 18 and 19 further show rails 102 and 104 extending on each side of the table which serve to facilitate deploying and folding the table. Foldable chairs 110 are also shown in FIGS. 18–19, one for each command station and which are folded and stored in the High Mobility Multipurpose Wheeled Vehicle (HMMWV) during transport. Typically, the command stations are configured in accordance with the A2C2S architecture and include five Scalable Processor Architecture (SPARC) AXI computers, a Tacital Operations Command Intercom SCI/Salmina Product (TOCNET) (SCI) intercom with six radio interfaces and five operator stations, four Single Channel Ground and Airborne Radio System (SINCGARS) SIP radios (RT-1523 AM-7238), one Satellite Communications (SATCOM)/Demand Assignment Multiple Access (DAMA), one HAVEQUICK, one Enhance Position Location Reporting Radio System (EPLRS), and one Near Term Digital Radio (NTDR). There is also a Precision Lightweight GPS Receiver (PLGR) GPS and ABCS software Maneuver Control System (MCS), Advanced Field Artillery Tactical Data Systems (AFATDS), All Source Analysis System (ASAS), Combat Service Support Control System (CSSCS), Air and Missile Defense Work Station (AMDWS) and FBCB2. The electronic equipment stations are permanently mounted to the table via brackets as shown at 116 in FIG. 18.

Figure 20:
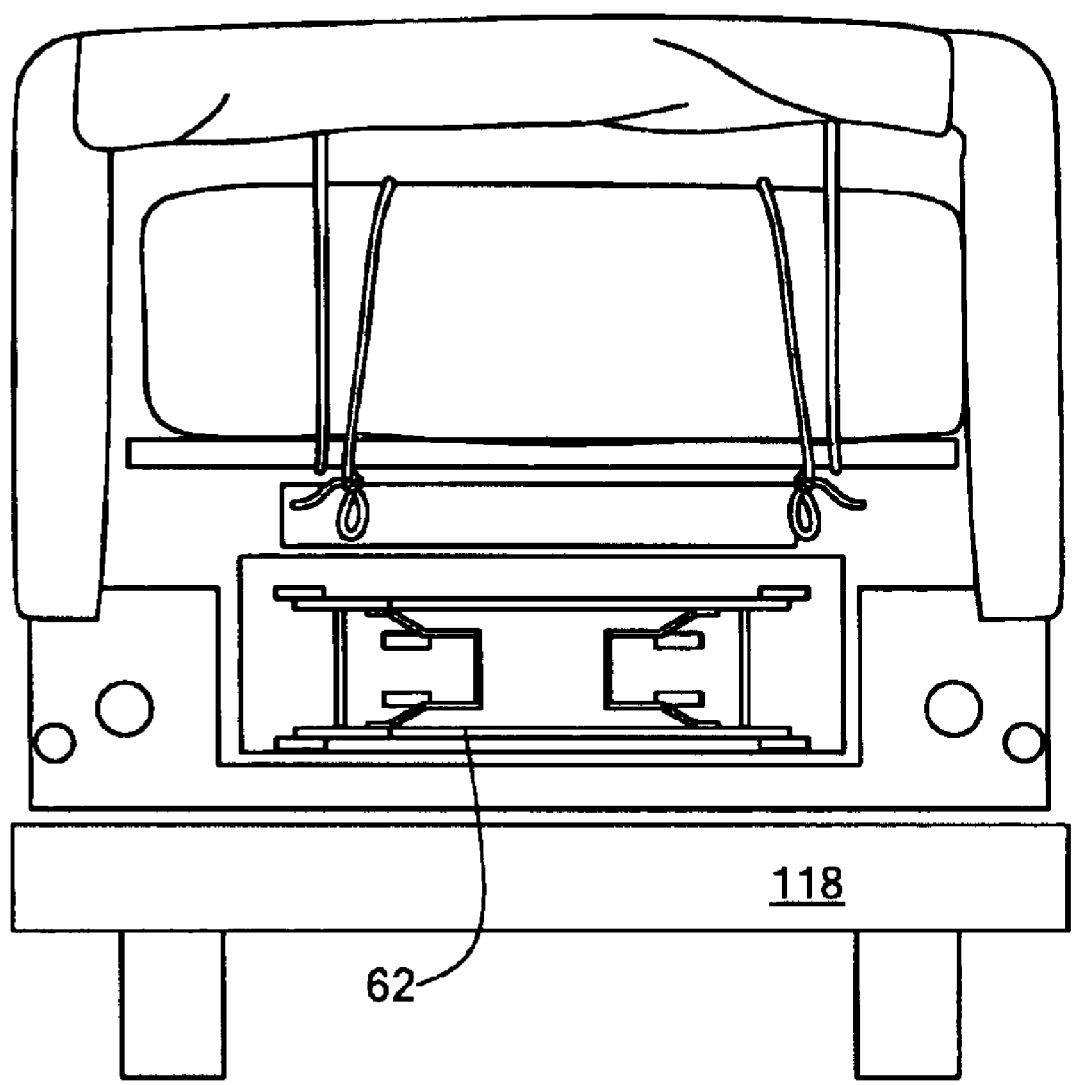
FIG. 20 is another schematic view showing the tent and the command table of the subject invention in place in the transport vehicle and ready to be deployed to a battle field or other site.

Typically, the proximal end of the forward section of the table rests on the bumper 118, FIG. 20 of the transport vehicle as shown in FIG. 18. Cables such as cables 120, 121, FIG. 14 are removably connected to the rail of the intermediate section of the command table and extend upwards to the transportation vehicle for supporting the command table during deployment.

Figure 21:
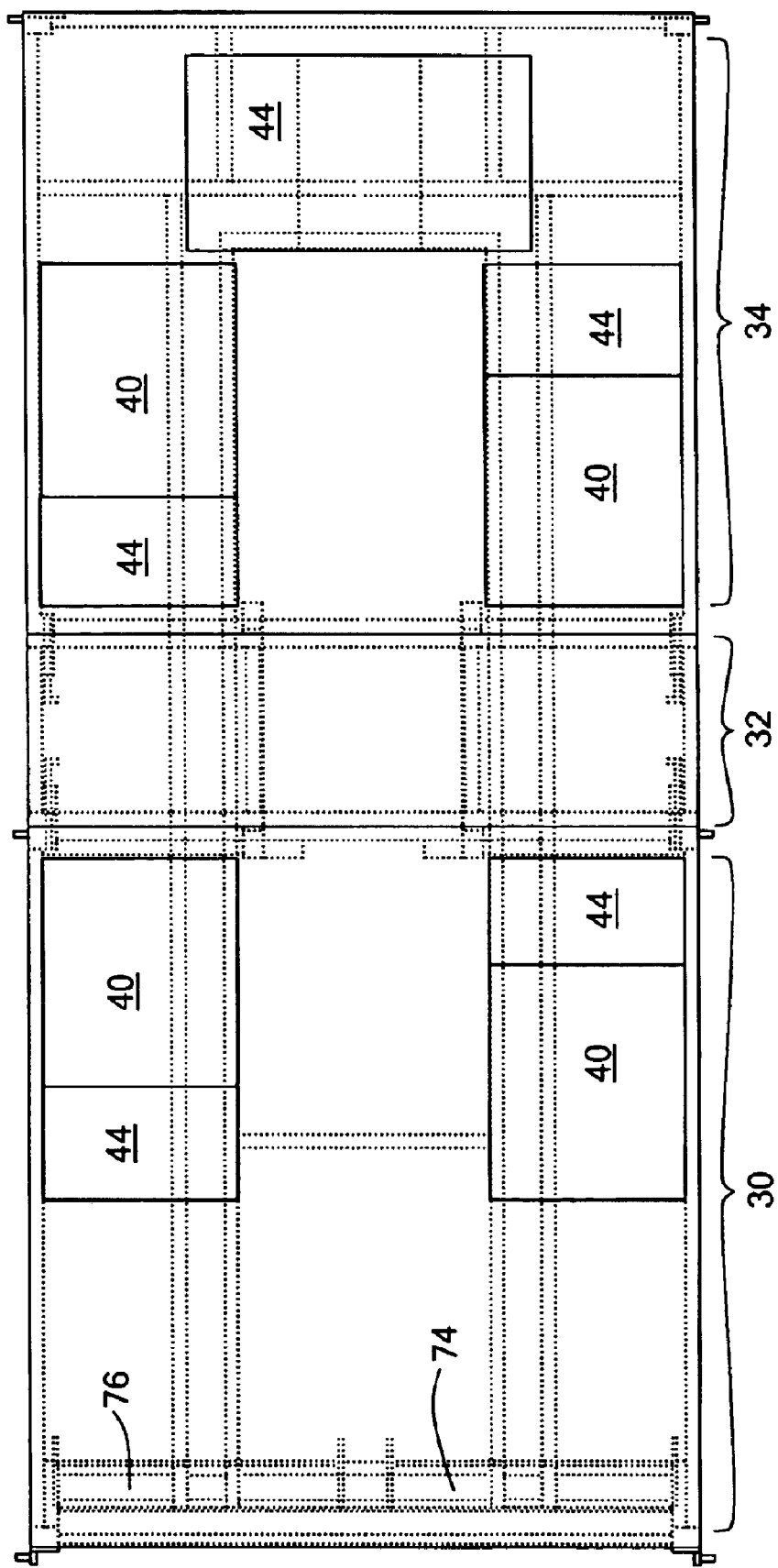
FIG. 21 is a top view of the folding command table of the subject invention in its deployed state.
Figure 22:
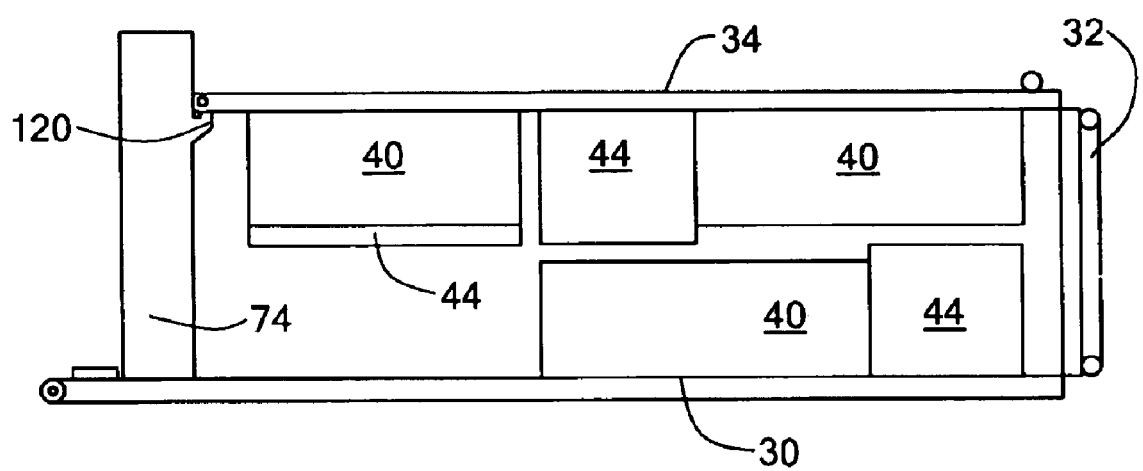
FIG. 22 is a side view of the folding command table of this invention in its folded configuration.

FIGS. 21 and 22 show the preferred embodiment of the command table of the subject invention wherein there are five integrated communications stations 44 and four integrated workstations 40. FIG. 22 also shows lip 120 of upstanding bracket 74 which supports the distal end of aft section 34 in the folded configuration.

The result is a highly maneuverable mobile battlefield center lightweight enough to be transported by an aircraft such as the UH-60 Blackhawk helicopter. The command table weighs 325 pounds and the tent weighs 265 pounds. The mobile battle center of the subject invention is designed to be flexible and in accordance with an accepted, standardized architecture such as the A2C2S system. There is no need to unpackage and hookup the associated electronic equipment. Instead, the workstations are integrated with the command table and the equipment racks are integrated with the transport vehicle which is typically a HMMWV vehicle but could also be an SUV, tank, or other vehicle. The mobile battle center can be set up in a matter of minutes and also torn down just as quickly. Power supply is provided via the transport vehicle and the result is a much more versatile maneuverable, lightweight, and quickly deployable mobile battle center with a foldable command table having integrated electronic equipment stations. The tent is typically used to cover and protect the foldable command table and the foldable chairs. The tent, foldable command table, and chairs are compact enough to be packaged in a specially configured HMMWV vehicle equipped with the necessary electronic equipment in one or more equipment racks.

Figure 23:
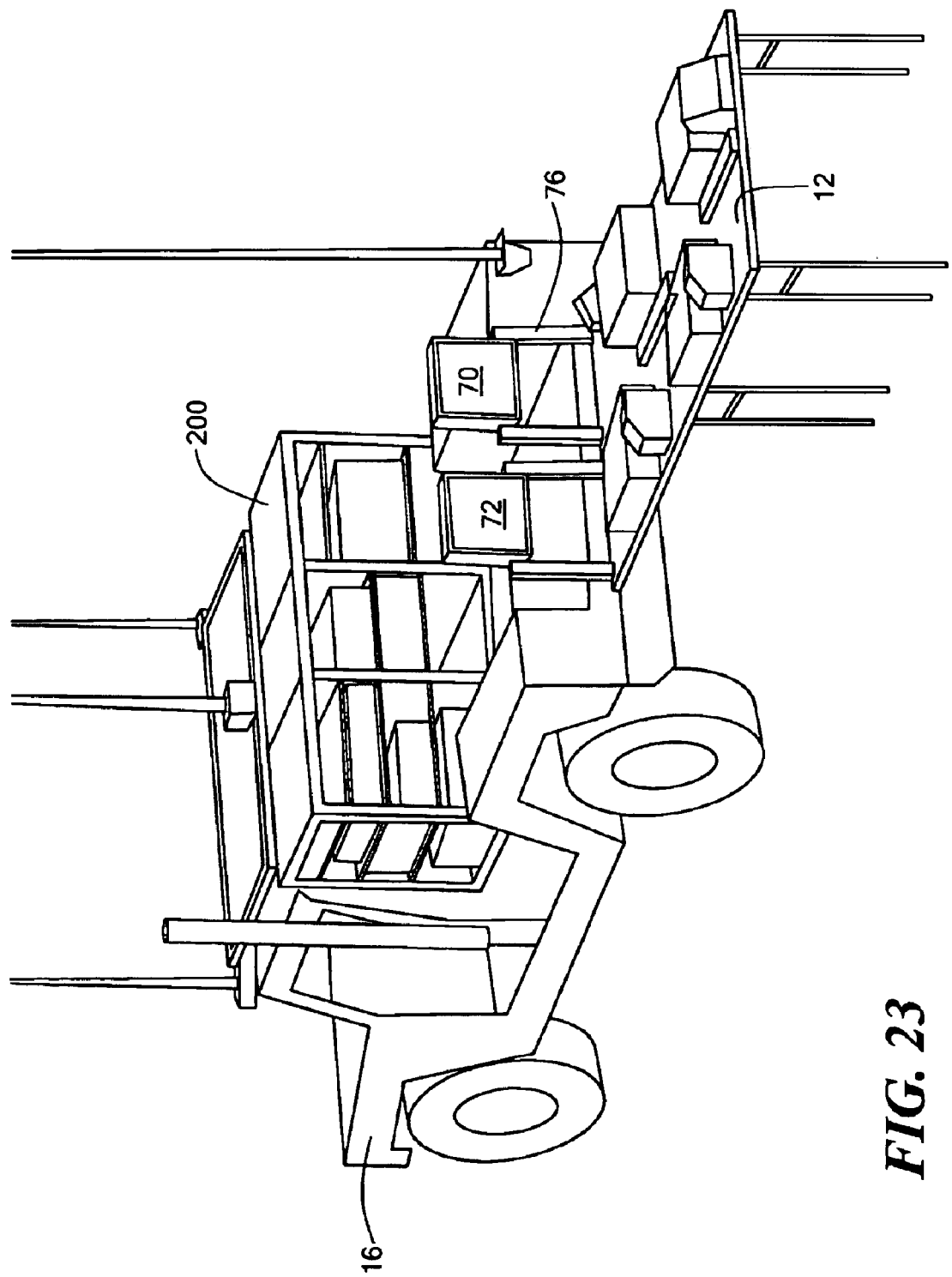
FIG. 23 is a schematic three-dimensional view showing certain subsystems associated with the mobile battle center of the subject invention including the equipment rack of the transport vehicle and the folding command table.
Figure 24:
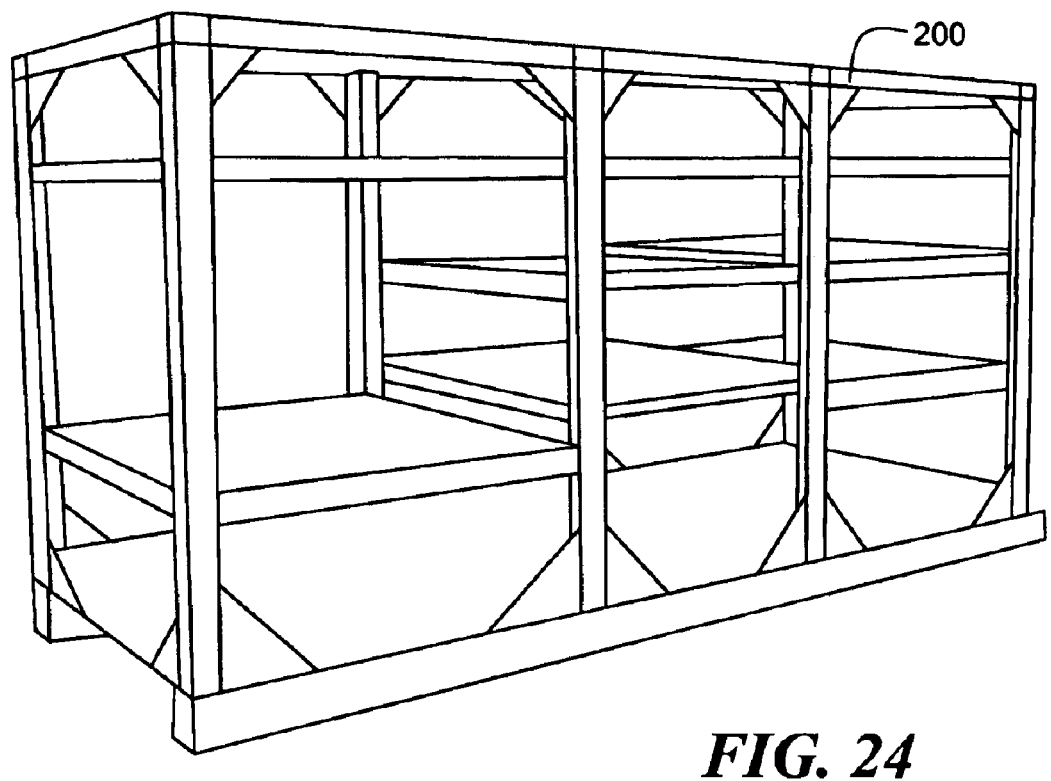
FIG. 24 is a schematic view showing the equipment rack of the subject invention before the electronic equipment is mounted thereto.
Figure 25:
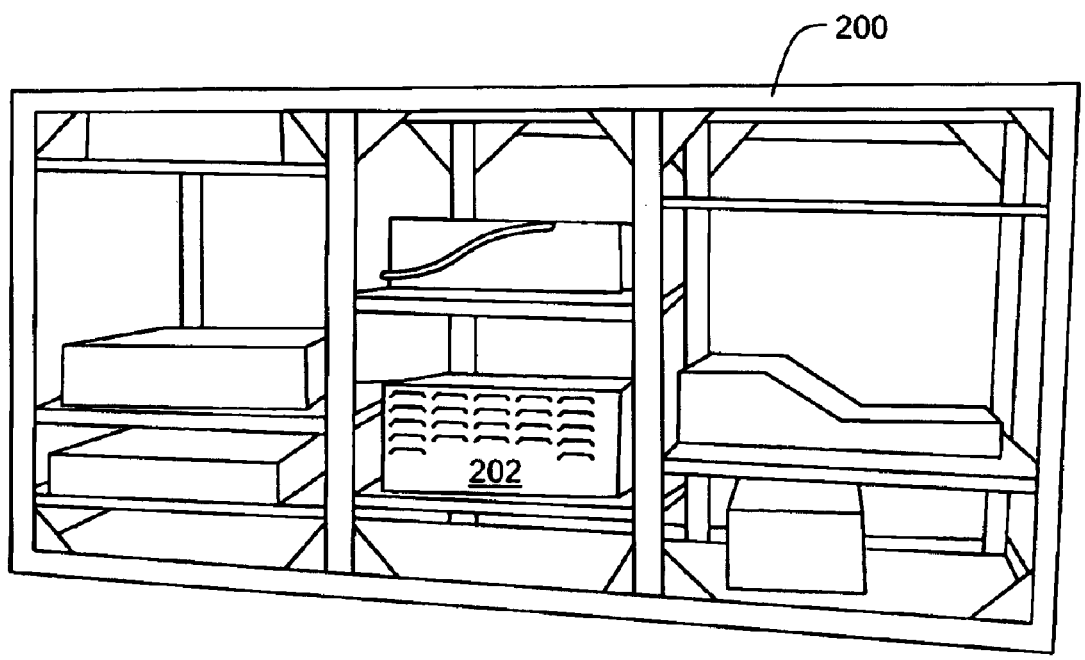
FIG. 25 is a schematic view showing the electronic equipment securely mounted in the equipment rack of the subject invention.

FIG. 23 schematically shows transport vehicle 16, command table 12 supported by the folding table legs discussed above and the rear bumper of the transport vehicle and also electronic equipment rack 200 securely mounted to transport vehicle 16. Equipment rack 200 is shown alone in FIG. 24 removed from transport vehicle 16, FIG. 23 and in FIG. 25 equipment rack 200 is shown loaded with electronic equipment 202.

Figure 26:
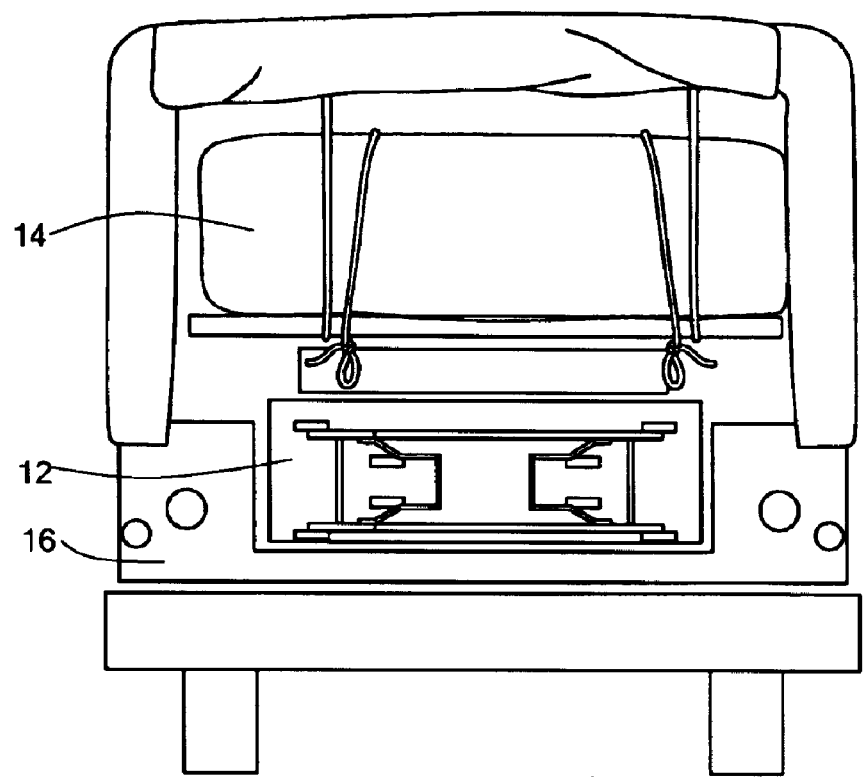
FIG. 26 is another schematic view showing the primary components associated with the mobile command center of this invention with the foldable tent and foldable command table in their stored configurations and ready for transport.
Figure 27:
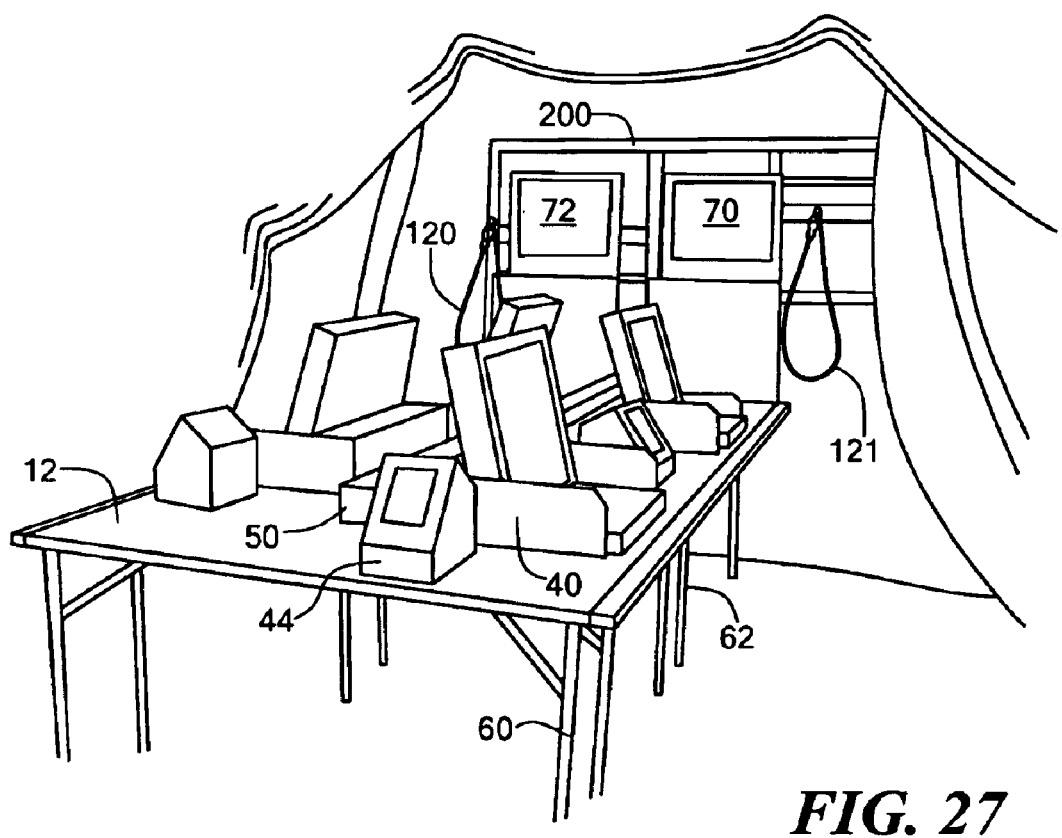
FIG. 27 is another schematic view showing the fully deployed folding command table and its associated electronic equipment stations ready for use.
Figure 28:
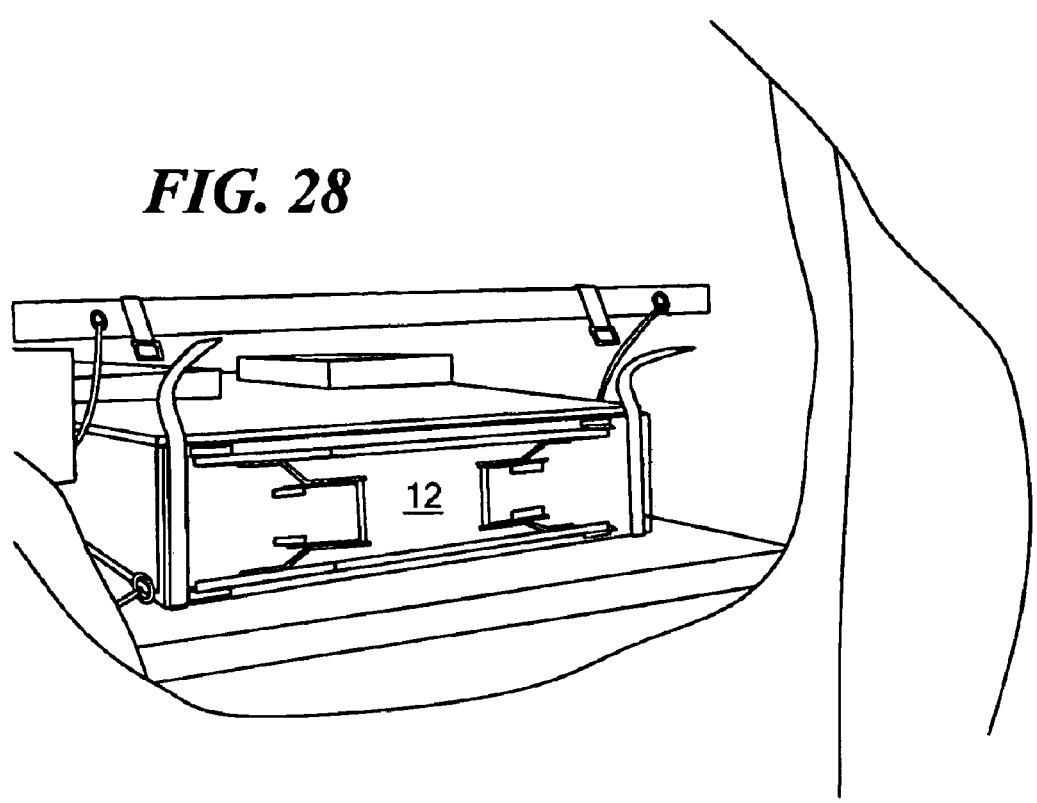
FIGS. 28–39 are schematic views showing how the folding command table is deployed for use in accordance with the subject invention.
Figure 29:
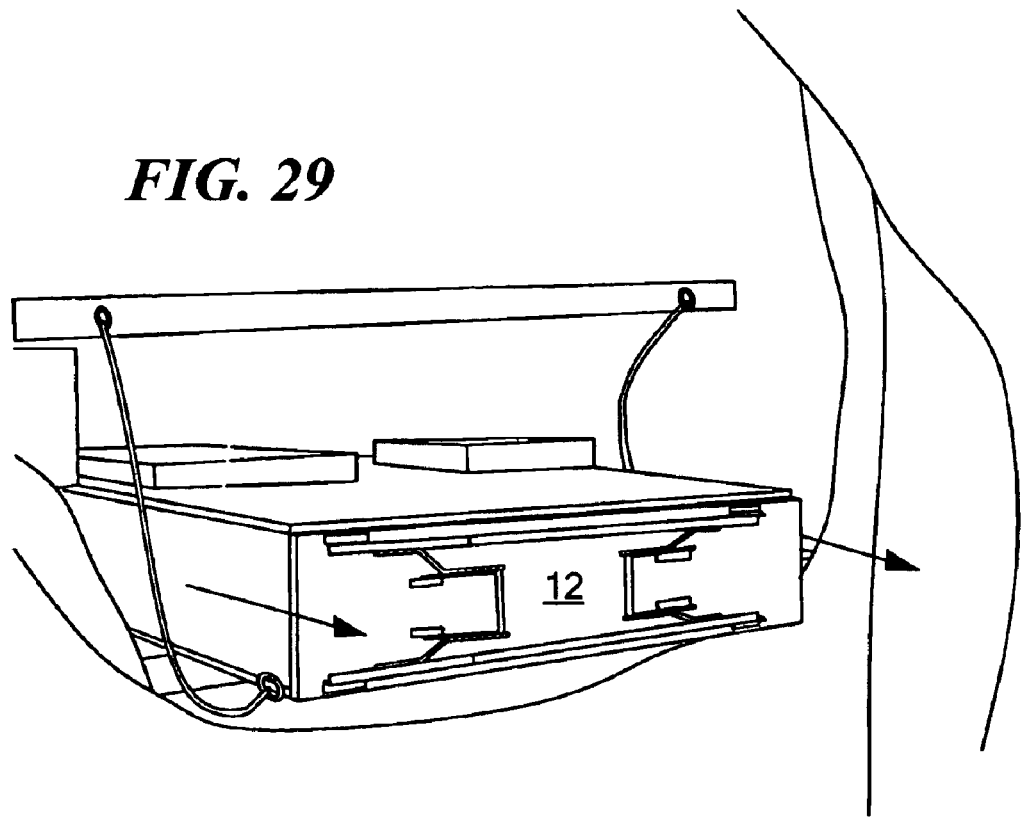
Figure 30:
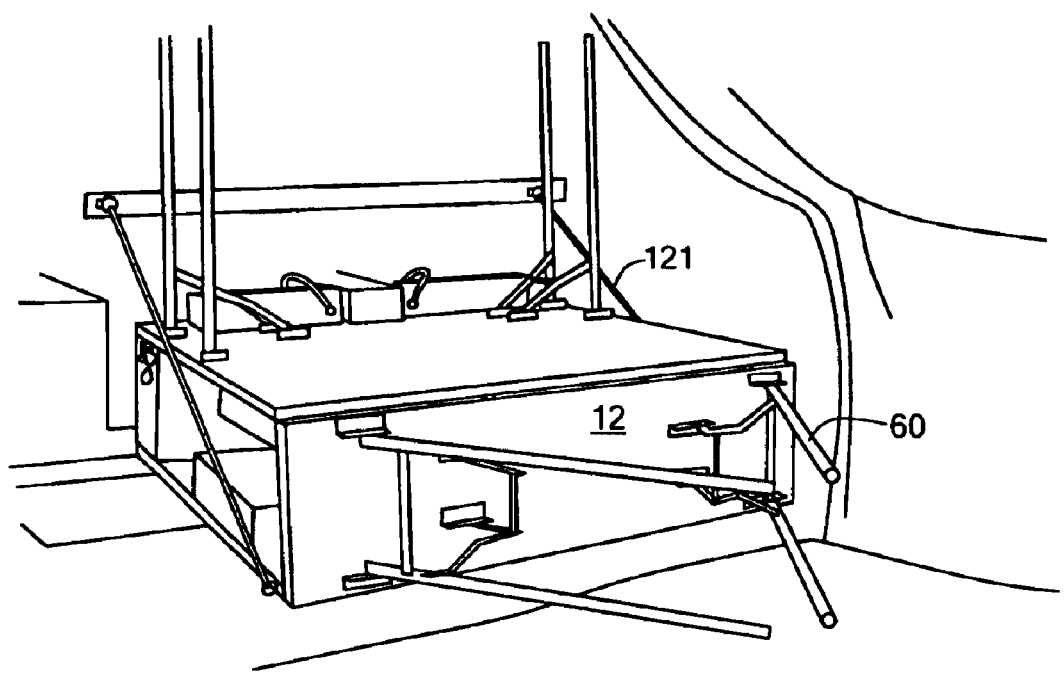
Figure 31:
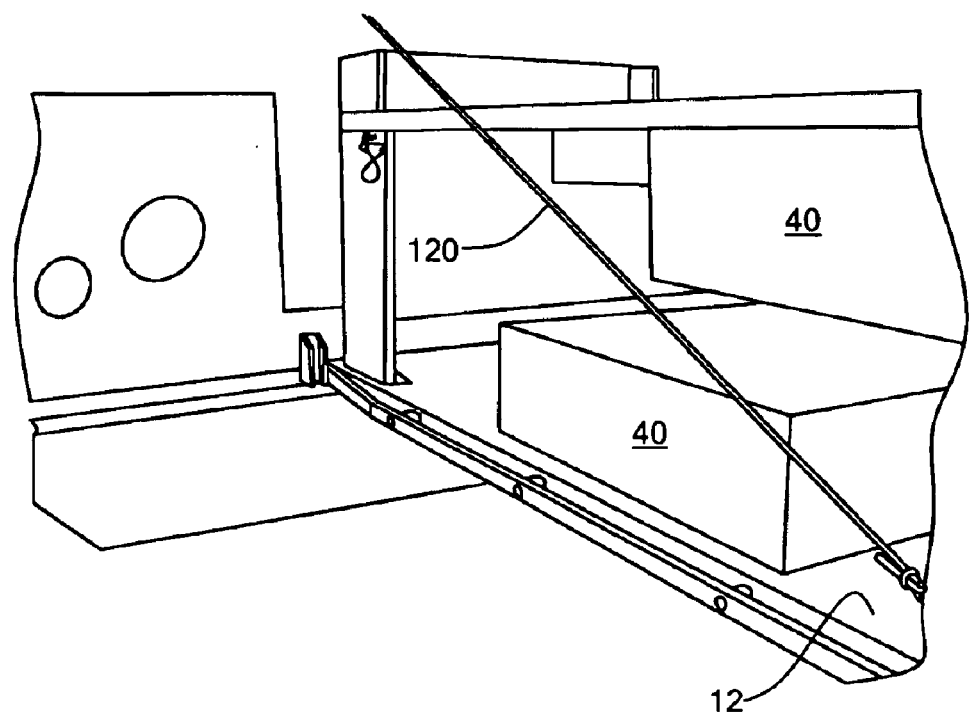
Figure 32:
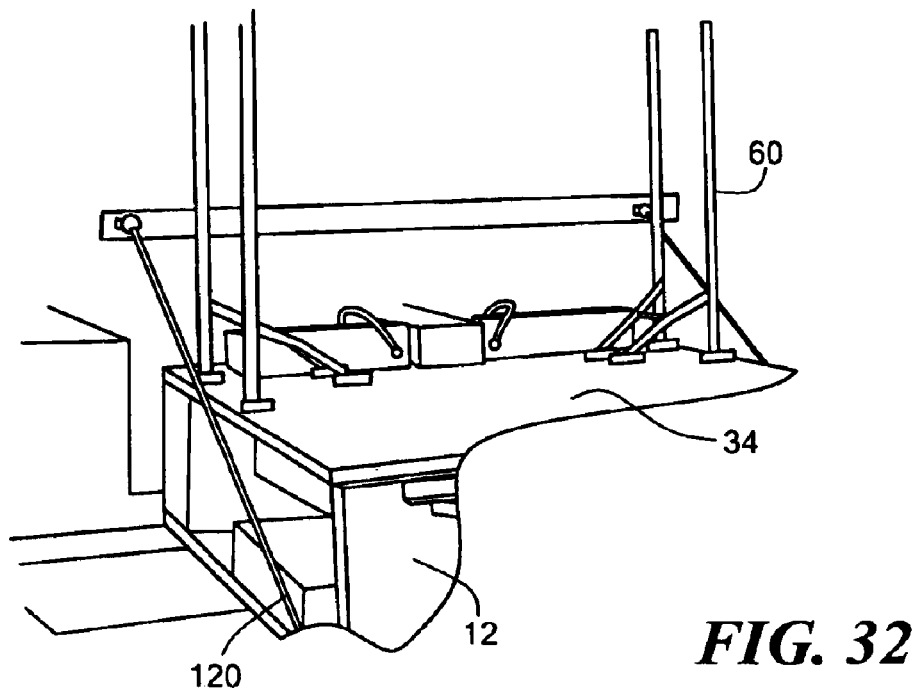
Figure 33:
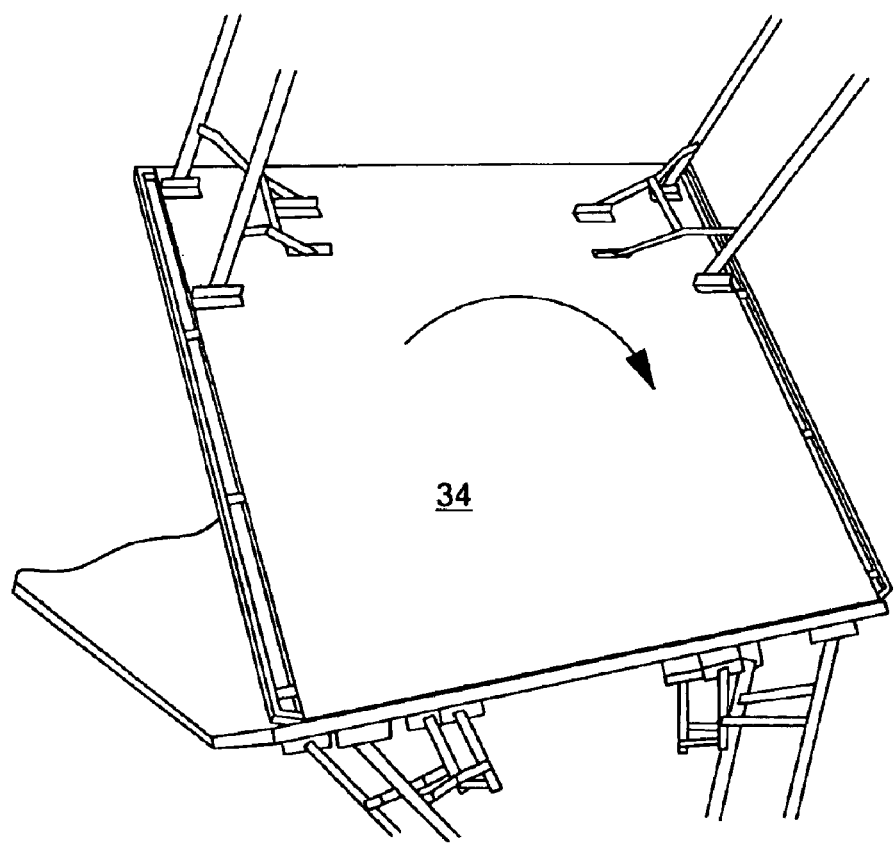
Figure 34:
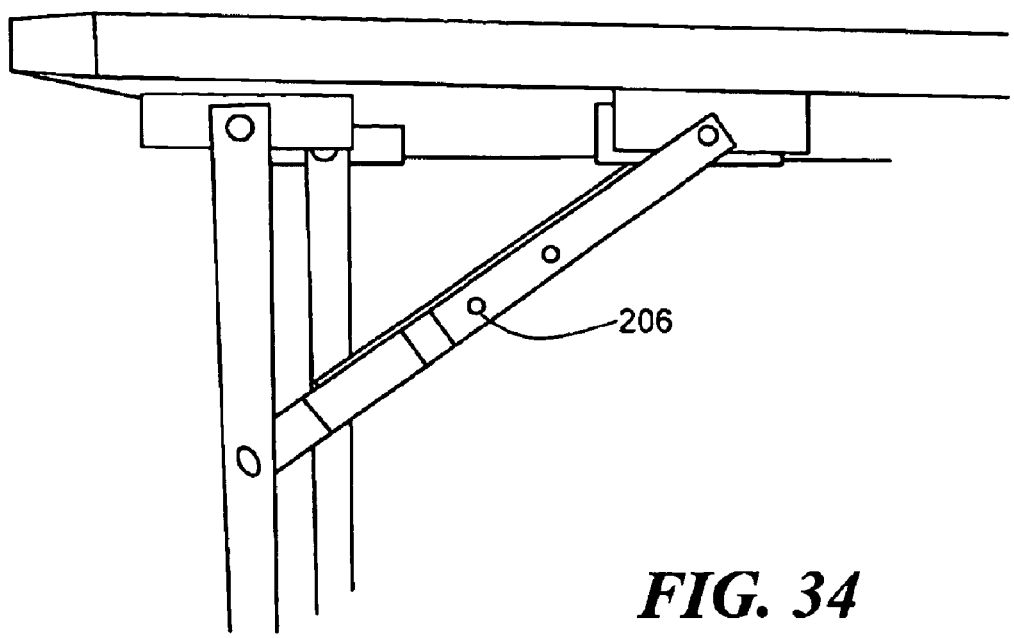
Figure 35:
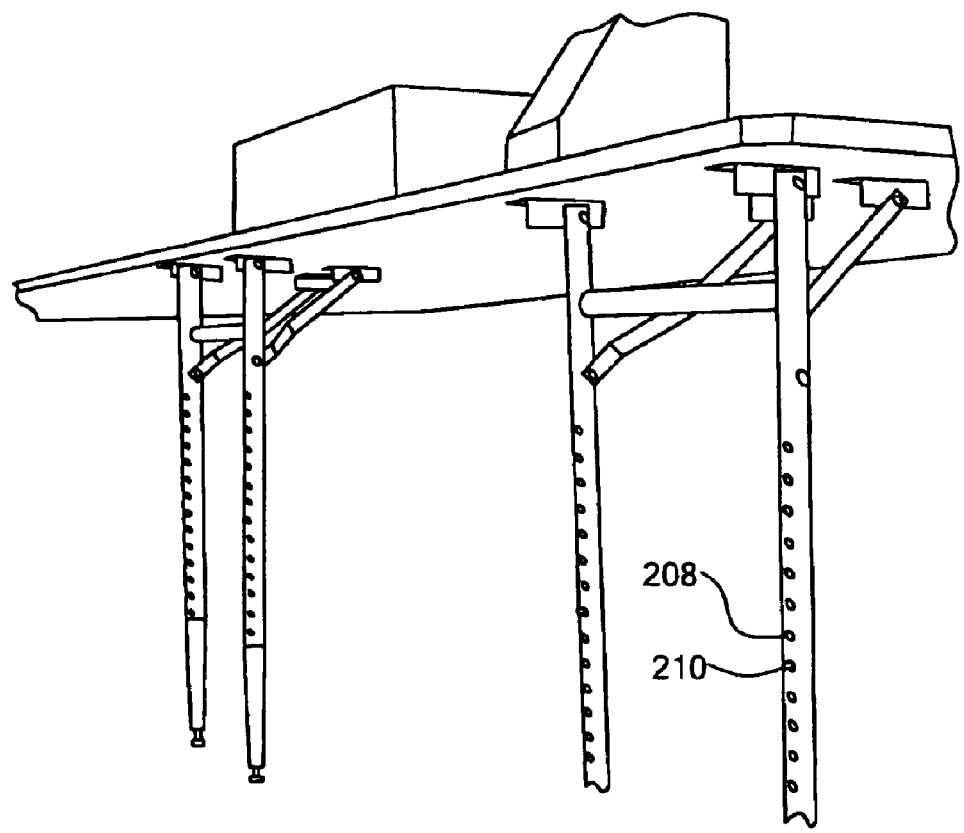
Figure 36:
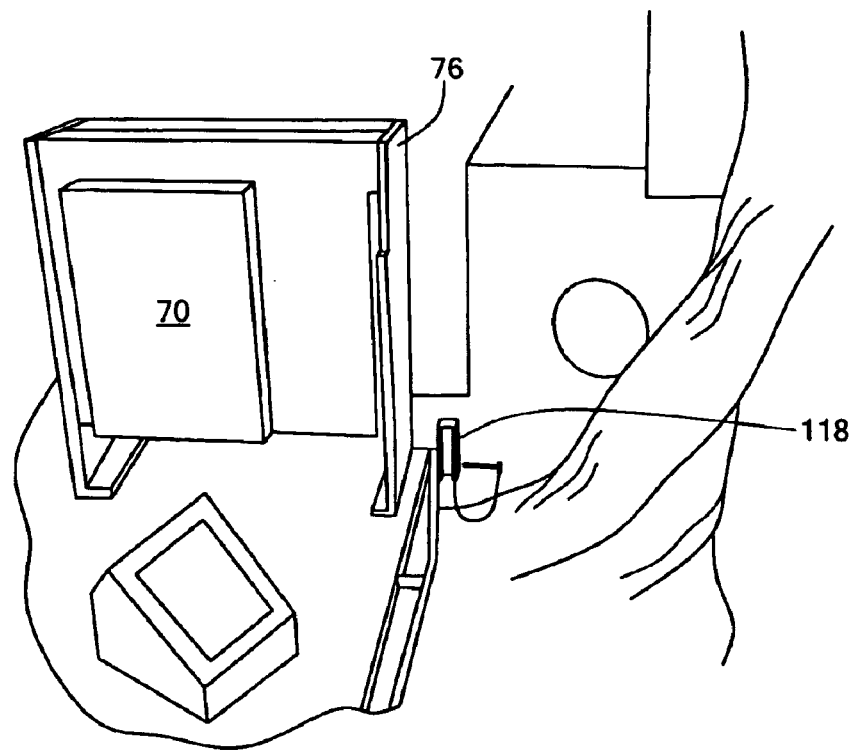
Figure 37:
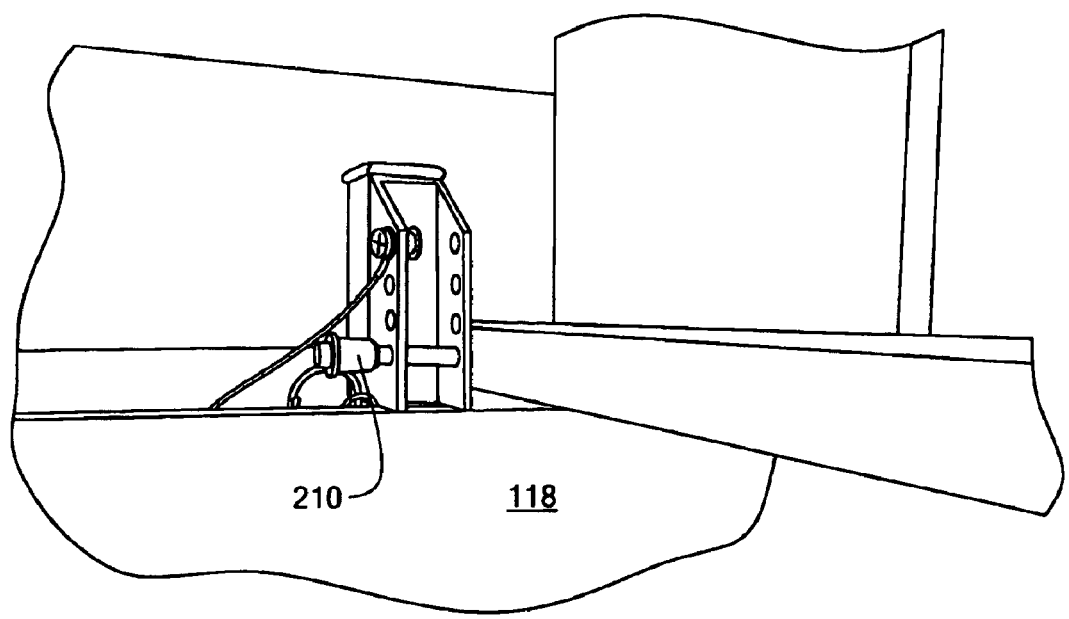
Figure 38:
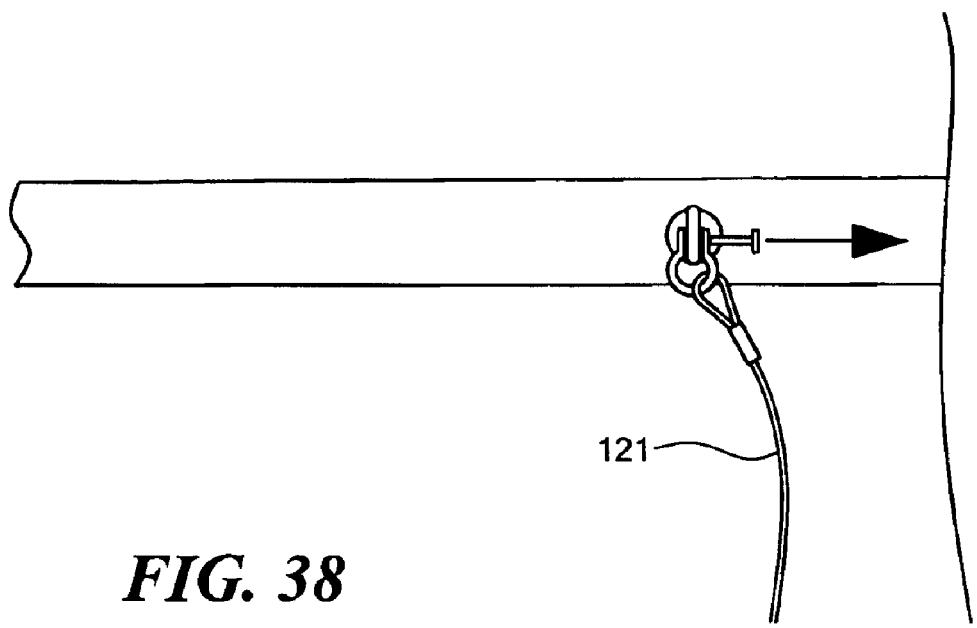
Figure 39:
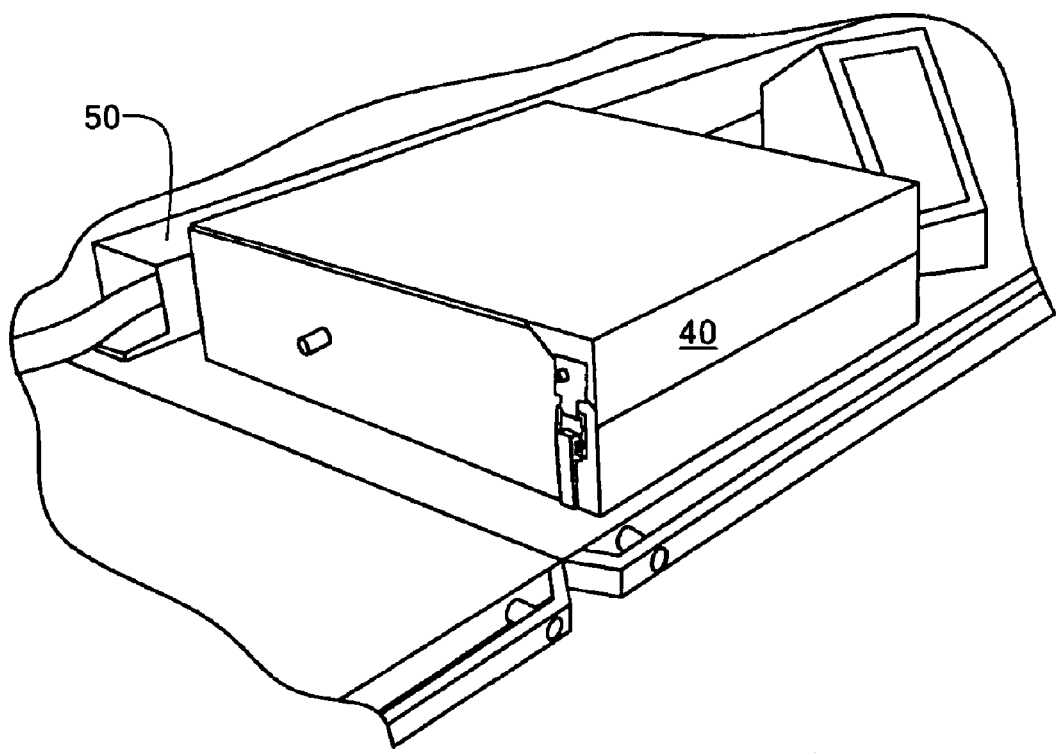

FIG. 26 is another schematic view showing foldable tent 14 and foldable command table 12 stored in transport vehicle 16. FIG. 27 shows foldable command table 12 fully deployed, equipment rack 200 associated with the transport vehicle and cables 120 and 121 used to deploy foldable command table 12. To deploy foldable command table 12 as shown in FIG. 27, first the removable tie-down straps are removed as shown in FIG. 28, and then table 12 is slid out of the transport vehicle, placed on the rear bumper thereof, and partially supported by cables 120 and 121, FIG. 30. FIG. 30 also shows how foldable legs 60 are deployed while FIG. 31 shows table 12 placed on the rear bumper of the transport vehicle and cable 120 supporting foldable command table 12 still in its folded configuration. In FIG. 32, foldable legs 60 hingedly connected to aft section 34 are unfolded and in FIG. 33 aft section 34 itself is unfolded. Locking mechanism 206, FIG. 34 secures the foldable legs in place and the table can then be adjusted in height and leveled by leveling mechanisms 208 and 210, FIG. 35. FIG. 36 shows how table 12 (after being leveled and after the legs are deployed) is pinned to the bumper 118 of the transport vehicle using pin mechanism 210, FIG. 37. Now, cables 120 and 121 can be removed and stored as shown in FIG. 38. Finally, the electronic equipment stations such as station 40, FIG. 39 are unlocked and the screens thereof raised.

Specific features of the invention are shown and/or highlighted in some drawings and not in others. This is for convenience only as each feature may be combined with any or all of the other features in accordance with the invention. Also, the words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims:

What is claimed is:

1. A mobile battle center comprising:
   a command table including:
   an aft section,
   a forward section,
   electronic equipment stations securely mounted to the aft section, the forward section, or both sections,
   an intermediate section hinged to the forward section and the aft section, the aft section foldable up and over the forward section for transport of the table, the intermediate section providing clearance for the electronic equipment stations when the table is folded, and
   foldable legs for supporting the table in the deployed position.

2. The mobile battle center of claim 1 in which the aft, forward, and intermediate sections are made of opposing face sheets with a honeycomb core therebetween.

3. The mobile battle center of claim 1 further including a communications bus extending from the aft section to the forward section electrically connecting the electronic equipment stations to a remote equipment rack.

4. The mobile battle center of claim 1 further including brackets upstanding from the proximal end of the forward section for supporting the distal end of the aft section in the folded position.

5. The mobile battle center of claim 4 in which the brackets support monitors hingedly attached thereto, the monitors foldable adjacent the brackets and deployable upwards.

6. The mobile battle center of claim 1 in which the electronic equipment stations include communications stations and workstations.

7. The mobile battle center of claim 6 in which there are five communications stations and four workstations.

8. The mobile battle center of claim 7 in which two work stations are located on opposite sides of the forward section and two workstations are located on opposite sides of the aft section.

9. The mobile battle center of claim 7 in which there are two communications stations located on opposite sides of the forward section, two communications stations located on opposite sides of the aft section, and one communications station located on the distal end of the aft section.

10. The mobile battle center of claim 9 in which the distal end of the aft section further includes electrical interconnections for a personal computer.

11. The mobile battle center of claim 8 in which the oppositely located workstations are offset from each other.

12. The mobile battle center of claim 9 in which the oppositely located communications stations are offset from each other.

13. The mobile battle center of claim 1 in which there are four sets of foldable legs.

14. The mobile battle center of claim 13 in which two sets of foldable legs are hingedly attached on opposite sides of the aft section and two sets of foldable legs are hingedly attached to opposite sides of the intermediate section.

15. The mobile battle center of claim 13 in which each set of legs includes two leg members.

16. The mobile battle center of claim 1 further including a rail extending on each side of the table.

17. The mobile battle center of claim 1 further including a set of foldable chairs for the command table.

18. The mobile battle center of claim 1 in which the electronic equipment stations are configured in accordance with the A2C2S architecture.

19. The mobile battle center of claim 1 in which the electronic equipment stations are mounted to the table via brackets.

20. The mobile battle center of claim 1 further including a foldable tent for covering the command table.

21. The mobile battle center of claim 20 further including a transport vehicle for transporting the tent and the command table.

22. The mobile battle center of claim 21 further including a boot extending between the tent when deployed and the transport vehicle.

23. The mobile battle center of claim 21 in which the transport vehicle includes an equipment rack electronically coupled to the electronic equipment stations of the command table.

24. The mobile battle center of claim 21 in which the transport vehicle is an HMMWV vehicle.

25. The mobile battle center of claim 23 in which the transport vehicle further includes one or more power supplies for powering the equipment rack.

26. The mobile battle center of claim 23 in which the transport vehicle further includes one or more antennas.

27. The mobile battle center of claim 21 in which the transport vehicle includes a rear bumper for supporting the proximal end of the forward section of the command table.

28. The mobile battle center of claim 21 further including cables removably connected to the intermediate section of the command table and extending upwards to the transport vehicle for supporting the command table during deployment.

29. The mobile battle center of claim 21 further including a system of ropes and pulleys attached to the transport vehicle for removing the tent from the transport vehicle.

30. A mobile battle center comprising:
a command table including:
an aft section,
a forward section,
electronic equipment stations securely mounted to the aft section, the forward section, or both sections and a bus housing electronic cables running to the electronic equipment stations,
an intermediate section hinged to the forward section and the aft section, the aft section foldable up and over the forward section for transport of the table, the intermediate section providing clearance for the electronic equipment stations when the table is folded,
foldable legs for supporting the table in the deployed position;
a foldable tent for covering the command table; and
a transport vehicle for transporting the tent and the command table, the transport vehicle including an equipment rack electrically coupled to the electronic equipment stations of the command table via the bus.

31. The mobile battle center of claim 30 in which the aft, forward, and intermediate sections of the table are made of opposing face sheets with a honeycomb core therebetween.

32. The mobile battle center of claim 30 further including brackets upstanding from the proximal end of the forward section of the table for supporting the distal end of the aft section in the folded position.

33. The mobile battle center of claim 32 in which the brackets support monitors hingedly attached thereto, the monitors foldable adjacent the brackets and deployable upwards.

34. The mobile battle center of claim 30 in which the electronic equipment stations include communications stations and workstations.

35. The mobile battle center of claim 30 in which there are five communications stations and four workstations.

36. The mobile battle center of claim 35 in which two work stations are located on opposite sides of the forward section and two workstations are located on opposite sides of the aft section.

37. The mobile battle center of claim 35 in which there are two communications stations located on opposite sides of the forward section, two communications stations located on opposite sides of the aft section, and one communications station located on the distal end of the aft section.

38. The mobile battle center of claim 37 in which the distal end of the aft section further includes electrical interconnections for a personal computer.

39. The mobile battle center of claim 36 in which the oppositely located workstations are offset from each other.

40. The mobile battle center of claim 37 in which the oppositely located communications stations are offset from each other.

41. The mobile battle center of claim 30 in which there are four sets of foldable legs.

42. The mobile battle center of claim 41 in which two sets of foldable legs are hingedly attached on opposite sides of the aft section and two sets of foldable legs are hingedly attached to opposite sides of the intermediate section.

43. The mobile battle center of claim 41 in which each set of legs includes two leg members.

44. The mobile battle center of claim 30 further including a rail extending on each side of the table.

45. The mobile battle center of claim 30 further including a set of foldable chairs for the command table.

46. The mobile battle center of claim 30 in which the electronic equipment stations are configured in accordance with the A2C2S architecture.

47. The mobile battle center of claim 30 in which the electronic equipment stations are mounted to the table via brackets.

48. The mobile battle center of claim 30 further including a boot extending between the tent when deployed and the transport vehicle.

49. The mobile battle center of claim 30 in which the transport vehicle is an HMMWV vehicle.

50. The mobile battle center of claim 30 in which the transport vehicle further includes one or more power supplies for powering the equipment rack.

51. The mobile battle center of claim 30 in which the transport vehicle further includes one or more antennas.

52. The mobile battle center of claim 30 in which the transport vehicle includes a rear bumper for supporting the proximal end of the forward section of the command table.

53. The mobile battle center of claim 30 further including cables removably connected to the intermediate section of the command table and extending upwards to the transport vehicle for supporting the command table during deployment.

54. The mobile battle center of claim 30 further including a system of ropes and pulleys attached to the transport vehicle for removing the tent from the transport vehicle.

55. A command table comprising:
an aft section;
a forward section;
brackets upstanding from the proximal end of the forward section;
electronic equipment stations including communications stations and workstations securely mounted to the forward and aft sections of the table and monitors hingedly mounted to the brackets;

a communications bus extending from the aft section to the forward section electrically connecting the electronic equipment stations to a remote equipment rack;

an intermediate section hinged to the forward section and the aft section so that the aft section can be folded up and over the forward section and supported by the brackets for transport of the table, the intermediate section providing clearance for the electronic equipment stations when the table is folded; and foldable legs for supporting the table in the deployed position.

56. The table of claim 55 in which the aft, forward, and intermediate sections are made of opposing face sheets with a honeycomb core therebetween.

57. The table of claim 55 in which the electronic equipment stations include communications stations and workstations.

58. The table of claim 57 in which there are five communications stations and four workstations.

59. The table of claim 58 in which two work stations are located on opposite sides of the forward section and two workstations are located on opposite sides of the aft section.

60. The table of claim 58 in which there are two communications stations located on opposite sides of the forward section, two communications stations located on opposite sides of the aft section, and one communications station located on the distal end of the aft section.

61. The table of claim 60 in which the distal end of the aft section further includes electrical interconnections for a personal computer.

62. The table of claim 59 in which the oppositely located workstations are offset from each other.

63. The table of claim 60 in which the oppositely located communications stations are offset from each other.

64. The table of claim 55 in which there are four sets of foldable legs.

65. The table of claim 64 in which two sets of foldable legs are hingedly attached on opposite sides of the aft section and two sets of foldable legs are hingedly attached to opposite sides of the intermediate section.

66. The table of claim 64 in which each set of legs includes two leg members.

67. The table of claim 55 further including a rail extending on each side of the table.

68. The table of claim 55 further including a set of foldable chairs for the command table.

69. The table of claim 55 in which the electronic equipment stations are configured in accordance with the A2C2S architecture.

70. The table of claim 55 in which the electronic equipment stations are mounted to the table via brackets.

* * * * *